(12) United States Patent
Kurzynski et al.

(10) Patent No.: US 11,962,824 B2
(45) Date of Patent: Apr. 16, 2024

(54) METHODS AND APPARATUS TO STRUCTURE PROCESSOR SYSTEMS TO DETERMINE TOTAL AUDIENCE RATINGS

(71) Applicant: The Nielsen Company (US), LLC, New York, NY (US)

(72) Inventors: David J. Kurzynski, South Elgin, IL (US); Fatemehossadat Miri, Chicago, IL (US); Rachel Worth Olson, Elk Grove Village, IL (US); Peter Schnatz, New York, NY (US); Balachander Shankar, Tampa, FL (US); Samantha M. Mowrer, San Francisco, CA (US); Michael Grotelueschen, Chicago, IL (US); Zachary Zofrea, St Petersburg, FL (US); Arijit Jha, Chicago, IL (US); Robert Gottesman, Santa Monica, CA (US); Michael Evan Anderson, Chicago, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/544,780

(22) Filed: Dec. 7, 2021

(65) Prior Publication Data
US 2022/0182697 A1 Jun. 9, 2022

Related U.S. Application Data

(60) Provisional application No. 63/122,941, filed on Dec. 8, 2020.

(51) Int. Cl.
*H04H 60/32* (2008.01)
*G06F 16/951* (2019.01)
*H04N 21/24* (2011.01)

(52) U.S. Cl.
CPC ....... *H04N 21/2407* (2013.01); *G06F 16/951* (2019.01)

(58) Field of Classification Search
CPC ............... H04N 21/2407; H04N 21/25; H04N 21/44224; H04N 21/812; H04N 21/6582
See application file for complete search history.

(56) References Cited

U.S. PATENT DOCUMENTS

| 6,108,637 A | 8/2000 | Blumenau |
| 8,370,489 B2 | 2/2013 | Mazumdar et al. |
| (Continued) | | |

OTHER PUBLICATIONS

Enoch et al., "Cracking the Cross-Media Code: How to Use Single-Source Measures to Examine Media Cannibalization and Convergence", Journal of Advertising Research, Jun. 1, 2010, 4 pages.

*Primary Examiner* — Gigi L Dubasky

(57) ABSTRACT

Methods, apparatus, systems, and articles of manufacture are disclosed to determine total audience ratings. An example apparatus includes metrics generator circuitry to generate a first audience size for media accessed by first devices of a first media platform at a first level of aggregation, the first level of aggregation corresponding to the media accessed on a first television network and on a first website, generate a second audience size for the media accessed by the first devices of the first media platform at a second level of aggregation, the second level of aggregation corresponding to the media accessed on the first television network and accessed on the first website and a second website, comparator circuitry to compare the first audience size to the second audience size, adjustor circuitry to reduce the first audience size based on the second audience size, and audience determination circuitry to determine a total audience size.

24 Claims, 20 Drawing Sheets

(56) References Cited

U.S. PATENT DOCUMENTS

| | | | |
|---|---|---|---|
| 2009/0292587 A1* | 11/2009 | Fitzgerald | G06Q 30/02 |
| | | | 705/7.29 |
| 2015/0095138 A1* | 4/2015 | Rao | H04N 21/44226 |
| | | | 705/14.41 |
| 2015/0178769 A1* | 6/2015 | Mirisola | G06Q 30/0246 |
| | | | 705/14.45 |
| 2017/0155956 A1* | 6/2017 | Nagaraja Rao | H04N 21/812 |
| 2019/0147461 A1* | 5/2019 | Sheppard | G06Q 30/0201 |
| | | | 705/14.41 |
| 2019/0220873 A1* | 7/2019 | Sullivan | G06Q 30/0201 |
| 2021/0158377 A1* | 5/2021 | Sheppard | G06Q 30/0201 |

* cited by examiner

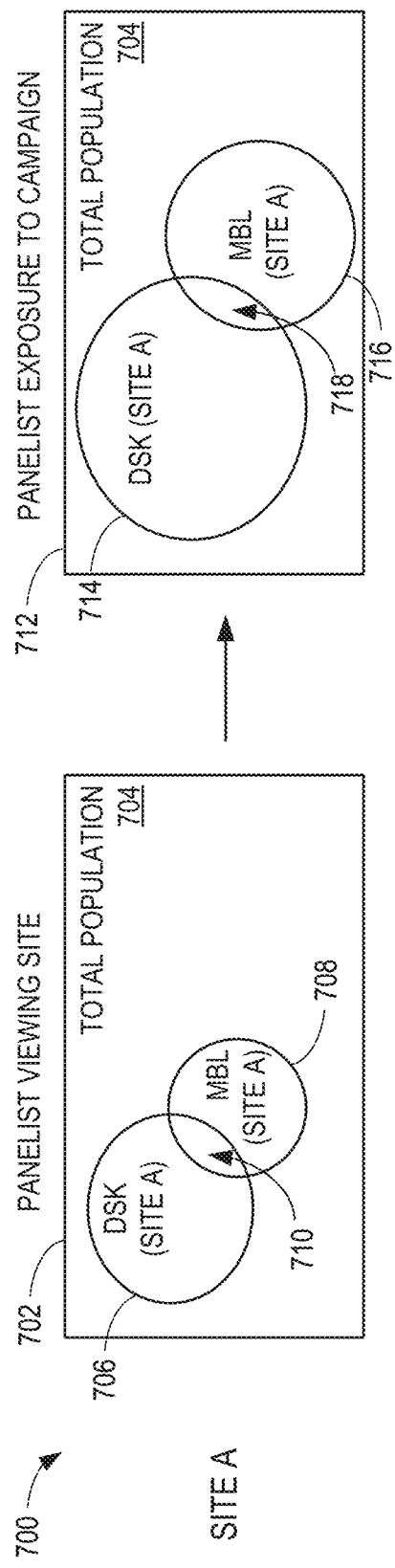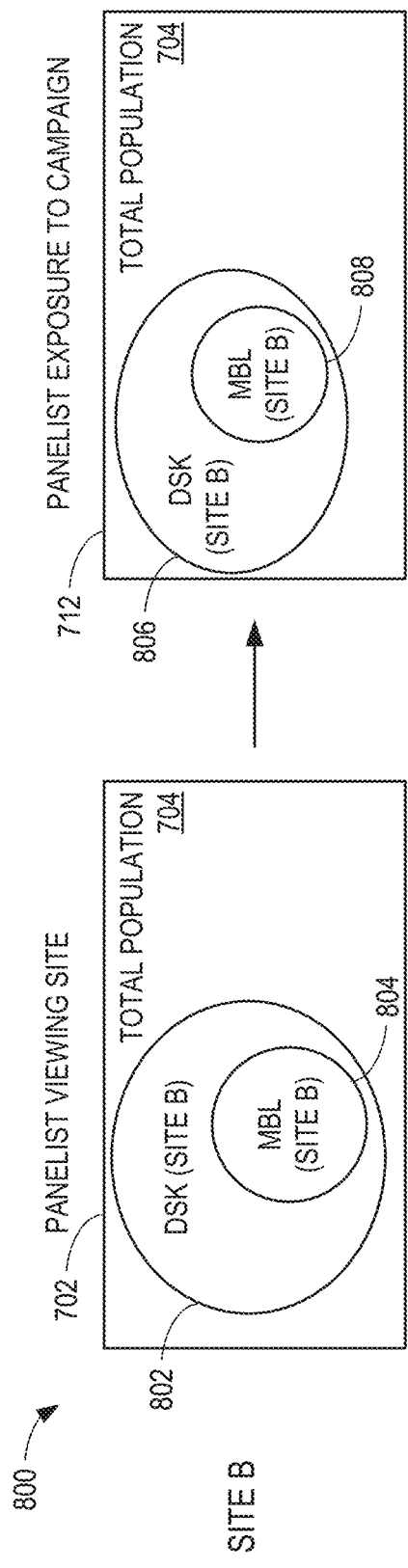

| AGGREGATION | SITE | NETWORK | TV ONLY 910 | DSK ONLY 912 | MBL ONLY 914 | TV & DSK 916 | TV & MBL 918 | DSK & MBL 920 | TV & DSK & MBL 922 |
|---|---|---|---|---|---|---|---|---|---|
| SITE/ NETWORK 902 | INSTAGRAM | ABC | 924 | | | | | | |
| | YOUTUBE | ABC | | 926 | | | | | |
| | SOMETHING.COM | ABC | | | | | | | |
| | INSTAGRAM | CBS | | | | | | | |
| | SOMETHING.COM | CBS | | | | | | | |
| | SOMETHING.COM | CBS | | | | | | | |
| MULT SITES/ NETWORK 904 | MULT | ABC | 928 | 930 | | | | | |
| | MULT | CBS | 932 | | | | | | |
| SITE/MULT NETWORKS 906 | INSTAGRAM | MULT | | 934 | | | | | |
| | YOUTUBE | MULT | | | | | | | |
| | SOMETHING.COM | MULT | | | | | | | |
| MULT SITES/MULT NETWORKS 908 | MULT | MULT | 936 | 938 | | | | | |

| REQUIREMENTS FOR EACH AGGREGATION: | A1 | A2 | A3 | A4 |
|---|---|---|---|---|
| DIRECTION: SAME OR OPPOSITE? | A1<=A2 | A2>=A1 | A3<=A1 | A4>=A3 |
| | A1>=A3 | A2>=A4 | A3<=A4 | A4<=A2 |
| | OPPOSITE | SAME | SAME | OPPOSITE |
| CAPPING ADJUSTMENT 1: | | A2= MAX(A1,A4) | | |
| CAPPING ADJUSTMENT 2: | | | A3=MIN(A1,A4) | |

| B1+C1+D1 | B2+C2+D2 | B3+C3+D3 | B4+C4+D4 |
|---|---|---|---|
| | B2+C2+D2<=B1+C1+D1 | B3+C3+D3<=B1+C1+D1 | B4+XC4+D4<=B3+C3+D3 |
| | B2+C2+D2>=B4+C4+D4 | B3+C3+D3>=B4+C4+D4 | B4+C4+D4<=B2+C2+D2 |
| | SAME | OPPOSITE | SAME |
| CAPPING ADJUSTMENT 3: | | B1+C1+D1=MAX(B2+C2+D2, B3+C3+D3) | | |
| CAPPING ADJUSTMENT 4: | | | B4+C4+D4=MIN(B2+C2+D2, B3+C3+D3) | |

| E1+F1+G1 | E2+F2+G2 | E3+F3+G3 | E4+F4+G4 |
|---|---|---|---|
| | E2+F2+G2<=E1+F1+G1 | E3+F3+G3>=E1+F1+G1 | E4+F4+G4<=E3+F3+G3 |
| | E2+F2+G2<=E4+F4+G4 | E3+F3_G3>=E4+F4+G4 | E4+F4+G4>=E2+F2+G2 |
| B3+C3+D3<=B1+C1+D1 | SAME | SAME | OPPOSITE |
| OPPOSITE | | | |
| CAPPING ADJUSTMENT 5: | | E2+F2+G2=MIN(E1+F1+G1, E4, F4,G4) | | |
| CAPPING ADJUSTMENT 6: | | | E3+F3+G3=MAX(E1+F1+G1,E4+F4+G4) | |

| REQUIREMENT: B4+C4+D4<= B3+C3+D3 | | | REQUIREMENT: B3+C3+D3<= B1+C1+D1 | |
|---|---|---|---|---|
| NXS: B4+C4+D4 PCSNDT | | | NX All sites: B3+C3+D3 PCNDT | ALL NETWORKS X ALL SITES: B1+C1+D1 PCDT |
| ABC | FB | 40,000 | ABC ALL SITES | 10000 |
| ABC | YT | 20,000 | | |
| ABC | INST | 6,000 | CBS ALL SITES | 20000 |
| CBS | FB | 30,000 | | ALL NETWORKS ALL SITES 15000 |
| CBS | YT | 18,000 | | |
| CBS | INST | 8,000 | | |

1800

| REQUIREMENT: B4+C4+D4<= B3+C3+D3 | | | REQUIREMENT: B3+C3+D3<= B1+C1+D1 | |
|---|---|---|---|---|
| NXS: B4+C4+D4 PCSDT | | | All NetworksX All sites:B2+C2+D2 PCSDT | ALL NETWORKS X ALL SITES: B1+C1+D1 PCDT |
| ABC | FB | 40,000 | ALL NETWORKS FB | 50000 |
| CBS | FB | 30,000 | | |
| ABC | INST | 6,000 | ALL NETWORKS INST | 9000 |
| CBS | INST | 8,000 | | |
| ABC | YT | 20,000 | ALL NETWORKS YT | 25000 |
| CBS | YT | 18,000 | | ALL NETWORKS ALL SITES 15000 |

| REQUIREMENT: E3+F3+G3 >= E1+F1+G1 | | | | | |
|---|---|---|---|---|---|
| REQUIREMENT: E4+F4+G4 <= E3+F3+G3 | | | | ALL NETWORKS X ALL SITES: E1+F1+G1 PCDT | |
| NXS: E4+F4+G4 PCSNDT | | | | | |
| ABC | FB | 40,000 | ABC | ALL SITES | 10000 |
| ABC | YT | 20,000 | | | |
| ABC | INST | 6,000 | | | |
| CBS | FB | 30,000 | CBS | ALL SITES | 20000 |
| CBS | YT | 18,000 | ALL NETWORKS | ALL SITES | 15000 |
| CBS | INST | 8,000 | | | |

1902

| REQUIREMENT: E4+F4+G4 >= E2+F2+G2 | | | | | |
|---|---|---|---|---|---|
| | | | ALL NETWORKS X S: E2+F2+G2 PCSDT | ALL NETWORKS X ALL SITES: E1+F1+G1 PCDT | |
| ABC | FB | 40,000 | ALL NETWORKS | FB | 50000 |
| CBS | FB | 30,000 | | | |
| ABC | INST | 6,000 | ALL NETWORKS | INST | 9000 |
| CBS | INST | 8,000 | | | |
| ABC | YT | 20,000 | ALL NETWORKS | YT | 25000 |
| CBS | YT | 18,000 | ALL NETWORKS | ALL SITES | 15000 |

FIG. 19

METHODS AND APPARATUS TO STRUCTURE PROCESSOR SYSTEMS TO DETERMINE TOTAL AUDIENCE RATINGS

RELATED APPLICATION

This patent application claims the benefit of U.S. Provisional Patent Application No. 63/122,941, which was filed on Dec. 8, 2020. U.S. Provisional Patent Application No. 63/122,941 is hereby incorporated herein by reference in its entirety.

FIELD OF THE DISCLOSURE

This disclosure relates generally to processor systems and, more particularly, to structuring computers to determine total audience ratings.

BACKGROUND

Tracking user access to media has been used by broadcasters and advertisers to determine viewership information for the media. Tracking viewership of media can present useful information to broadcasters and advertisers when determining placement strategies for advertising. The success of advertising placement strategies is dependent on the accuracy that technology can achieve in generating audience metrics.

BRIEF DESCRIPTION OF THE DRAWINGS

FIGS. 7 and 8 illustrate example correlation methodologies to determine cross-platform correlations.

FIG. 9 illustrates a table showing example aggregation levels to calculate total audience size.

FIGS. 14-16 illustrate example consistency rules of the example diagrams of FIGS. 10-13.

FIGS. 17-19 illustrate example datasets corresponding to the example consistency rules of FIGS. 14-16.

In general, the same reference numbers will be used throughout the drawing(s) and accompanying written description to refer to the same or like parts. The figures are not to scale.

Figure 1:
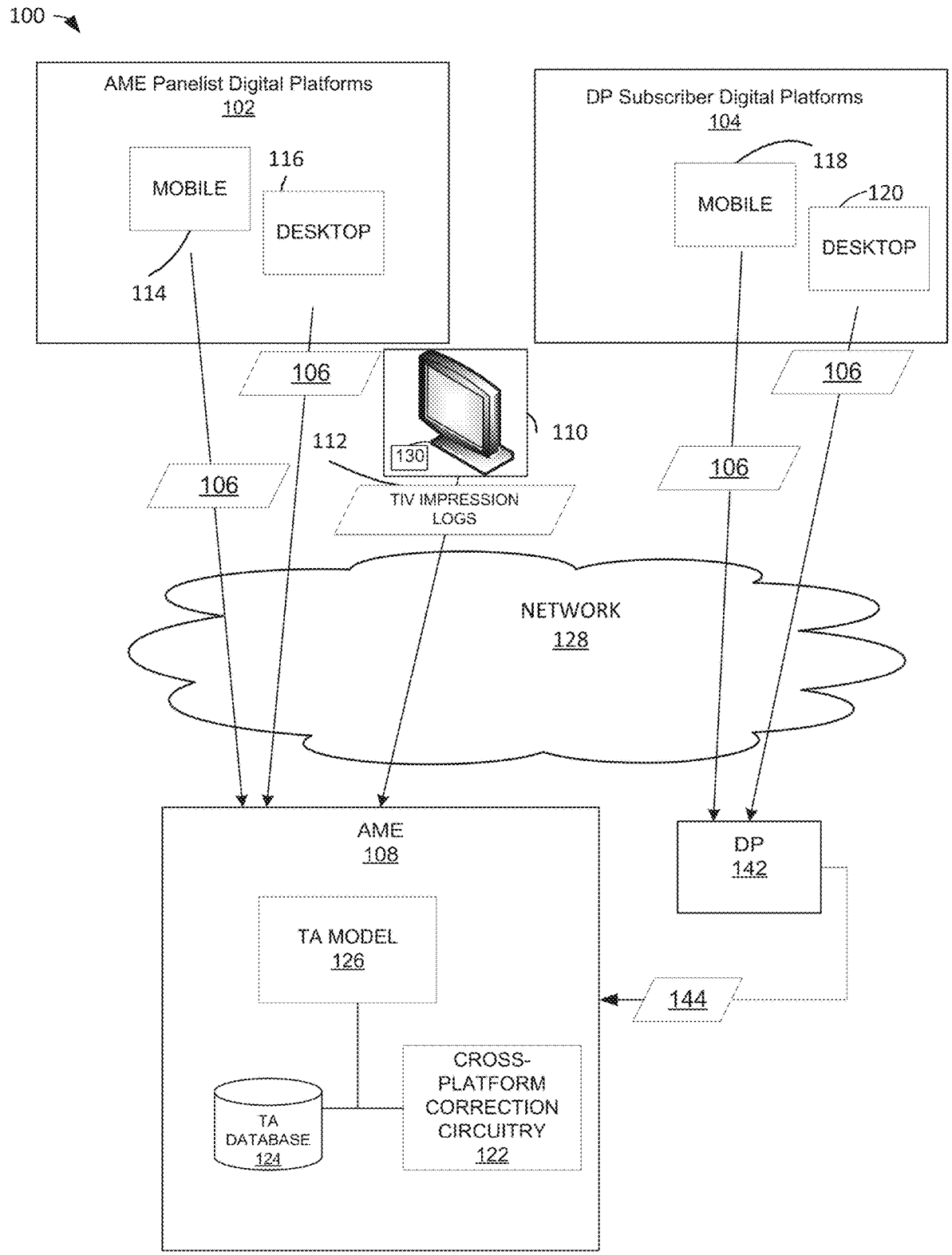
FIG. 1 illustrates an example computer-based audience measurement system including client devices that report audience impressions of media to an example audience measurement entity.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Techniques for monitoring user access to an Internet-accessible media, such as digital television (DTV) media and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau. U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client device requests the media, both the media and the monitoring instructions are downloaded to the client device. The monitoring instructions are, thus, executed whenever the media is accessed, be it from a server or from a cache. Upon execution, the monitoring instructions cause the client device to send or transmit monitoring information from the client device to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, Internet television programs, Internet radio programs, movies, advertisements, streaming media, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client device and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter. MySpace, etc.), multi-service sites (e.g., Yahoo!, Google, Axiom. Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when the subscribers visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although an AME (e.g., a third party) might find it advantageous to access the cookies set by the database proprietors, they are unable to do so.

The inventions disclosed in Mazumdar et al., U.S. Pat. No. 8,370,489, which is incorporated herein by reference in its entirety, enable an AME to leverage the existing databases of database proprietors to collect more extensive Internet usage by extending the impression request process to encompass partnered database proprietors and by using such partners as interim data collectors. The inventions disclosed in Mazumdar accomplish this task by structuring the AME to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client device accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client device to thereby identify the client based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. For example, an impression request is a message or network communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporarily available online after broadcast, TV media, etc.). For example, a user may start watching the Walking Dead television program on a television as part of TV media, pause the program, and continue to watch the program on a tablet as part of DTV media. In such an example, the access of the program may be logged by an AME twice, once for an impression log associated with the television-based access, and once for the impression request generated by a tag (e.g., census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is necessary to adjust cross-platform media exposure totals by reducing (e.g., eliminating) the double counting of individual audience members that were exposed to media via more than one platform and/or are represented in more than one database of media impressions used to determine the reach of the media.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

Notably, although third-party cookies are useful for third-party measurement entities in many of the above-described techniques to track media accesses and to leverage demographic information from database proprietors, use of third-party cookies may be limited or may cease in some or all online markets. That is, use of third-party cookies enables sharing anonymous PII subscriber information across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop (or have already stopped) supporting third party cookies. This will make it more challenging for third-party measurement entities to track media accesses via first-party services. That is, although first-party cookies will still be supported and useful for media providers to track accesses to media via their own first-party servers, neutral third parties interested in generating neutral, unbiased audience metrics data will not have access to the impression data collected by the first-party servers using first-party cookies. Examples, disclosed herein may be implemented with or without the availability of third-party cookies because, as mentioned above, the datasets used in the deduplication process are generated and provided by database proprietors, which may employ first-party cookies to track media impressions from which the datasets are generated. Examples disclosed herein alleviate the problem of insufficient data to infer audience metrics data and correct inconsistent audience metrics data.

Audience measurement entities (AMEs) may use television (TV) and digital measurements, e.g., measurements obtained from a panel or Digital Content Ratings (DCR), to monitor audiences of media. In many cases, a single unique audience member may be exposed to an item of media via more than one platform, e.g., TV and a digital device, thus creating an overlap between TV and digital measurements. Deduplication is a process that is used to adjust cross-platform media exposures by deduplicating multiple logged impressions attributed to the same audience member so that an individual audience member exposed to the same media via more than one platform is counted only once for purposes of determining a unique audience (e.g., a deduplicated audience). A unique audience can then be used to determine the reach of the media. Prior techniques to determine unique audience sizes and demographic distributions of audiences of media involve AMEs using third-party cookies to leverage demographic impression information logged by database proprietors based on media accessed by subscribers of those database proprietors. However, measurements based on such third-party cookies may be limited or may cease in some or all online markets.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a random forest regression model is used. Using a random forest regression model enables predictive variables to be used to determine total audience size. In general, machine learning models/architectures that are suitable to use in the example approaches disclosed herein will be the random forest regression model. However, other types of machine learning models could additionally or alternatively be used such as a multivariate regression model, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, unsupervised training (e.g., used in deep learning, a subset of machine learning, etc.) involves inferring patterns from inputs to select parameters for the ML/AI model (e.g., without the benefit of expected (e.g., labeled) outputs).

Training is performed using training data. In examples disclosed herein, the training data originates from historical audience data. Once training is complete, the model is deployed for use as an executable construct that processes an input and provides an output based on the network of nodes and connections defined in the model. The model is stored at an example AME.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Examples disclosed herein may be used to deduplicated total audience (TA) data (e.g., to deduplicate television (TV) and rest-of-web (ROW) (TV+ROW) audience exposure and deduplicate TV, ROW, and walled garden (WG) (TV+ROW+WG) audience exposure). In examples disclosed herein, a total audience (TA) for a media item (e.g., a particular television program, a particular streaming video, a particular song, a particular webpage or website, a particular advertisement, etc.) is the total number of unique people that accessed that media item across one or more media access platforms such as mobile platforms, desktop platforms, or television platforms. For example, examples disclosed herein may be used to determine a total audience size for TV, ROW, and WG audiences. In examples disclosed herein, a WG audience is limited to the media (e.g., particular streaming videos, particular songs, particular webpages or websites, particular advertisements, etc.) provided by a database proprietor (e.g., Facebook, Google, Amazon, etc.). In some examples, the database proprietor may or may not allow the WG audience to view media if the media is barred by the database proprietor. In examples disclosed herein, a ROW audience is not limited to media provided by a database proprietor. In some examples, a ROW audience can view media that has been barred from a WG audience. Some examples disclosed herein include metrics generator circuitry to generate a first audience size for media on a first media platform at a first level of aggregation. In examples disclosed herein, the first level of aggregation corresponds to the media provided by a first media network and accessed on a first website exclusive of a second website. In examples disclosed herein, the metrics generator circuitry also generates a second audience size for the media on the first media platform at a second level of aggregation. In examples disclosed herein, the second level of aggregation corresponds to the media provided by the first media network and accessed on the first website and the second website. In some examples disclosed herein, comparator circuitry compares the first audience size to the second audience size, adjustor circuitry reduces the first audience size based on the second audience size in response to the first audience size being greater than the second audience size, and audience determination circuitry determines a total audience size for the media on the first media platform based on the first audience size and the second audience size. In some examples, the metrics generator circuitry generates a first audience size including a summation of ones of the first audience size corresponding to the media accessed by the first media platform and a second media platform. In some examples, the metrics generator circuitry generates a second audience size including a summation of ones of the second audience size corresponding to the media accessed by the first platform and the second platform. In some examples, the adjustor circuitry increases the first audience size based on the second audience size in response to the first audience size being less than the second audience size.

FIG. 1 is an example computer-based audience measurement system 100 illustrating example media platforms that report audience impressions of media to an example audience measurement entity (AME) 108. FIG. 1 illustrates example AME panelist digital platforms 102 and example database proprietor (DP) subscriber digital platforms 104 including devices that access digital media via network communications from network-based media servers across a network, such as the Internet. In the illustrated example, devices of the AME panelist digital platforms 102 send example impression requests 106 for digital media accesses to the example AME 108. Also in the illustrated example, devices of the example DP subscriber digital platforms 104 send impression requests 106 for digital media accesses to an example database proprietor (DP) 142. The example impression requests 106 include information indicative of accesses to digital media via mobile and/or desktop devices. Servers and/or computers at the AME 108 and the DP 142 process/analyze the impression requests 106 to generate impression logs of impression records corresponding to different media items. In the illustrated example, the DP 142 generates DP impression logs 144 indicative of digital media accesses on the DP subscriber digital platforms. The example DP impression logs 144 may be values in the aggregate such as total impression counts for a media item per different demographic categories and/or audience sizes for a media item per the different demographic categories. Additionally or alternatively, the example DP impression logs 144 may include user-level values representative of impression counts per media item per user. In any case, the example DP 142 removes personally identifiable information (PII) from the DP impression logs 144 to prevent exposing identities of subscribers to the AME 108. The example DP 142 provides the DP impression logs 144 to the AME 108.

FIG. 1 further includes an example television platform 110 including devices that report example television impression logs 112 indicative of accesses to television media to the example AME 108 for further processing. The example television impression logs 112 includes television impression records that include information indicative of accesses to media via televisions. The example AME panelist digital platforms 102 include an example mobile platform 114 and an example desktop platform 116. Devices in the example AME panelist digital platforms 102 are capable of accessing media for ROW audiences. The example DP subscriber digital platforms 104 include an example mobile platform 118 and an example desktop platform 120. Devices in the example DP subscriber digital platforms 104 are capable of accessing media for WG audiences. In the illustrated example, the AME 108 includes an example cross-platform correction circuitry 122, an example total audience (TA) database 124, and an example TA model 126.

The example AME panelist digital platforms 102 and the example DP subscriber digital platforms 104 of the illustrated example may be any digital media platform capable of accessing media over a network shown in FIG. 1 as the example network 128 (e.g., the Internet). For example, the mobile platforms 114, 118 may include mobile phones, computing tablet devices, phablets, 2-in-1 portable computing devices, portable gaming devices, etc. The example desktop platforms 116, 120 may include desktop personal computers.

The example television platform 110 of the illustrated example is a media presentation device capable of accessing television media via cable connections, satellite connections, or over-the-air connections. Media accesses via devices in the example television platform 110 may be monitored using monitoring hardware and/or software in the devices and/or external set-top-boxes. In any case, such monitoring hardware, software, and/or external set-top-boxes record impressions associated with media accesses via devices in the example television platform 110. Such example monitoring hardware, software, and/or external set-top-boxes transmit the example television impression logs 112 (e.g., associated with media exposure) periodically and/or aperiodically to the example AME 108 via the example network 128 for further processing.

The example network 128 is a communications network. The example network 128 allows the example AME panelist digital platforms 102 to transmit example impression requests 106 to the example AME 108 and/or allows the example DP subscriber digital platforms 104 to transmit example impression requests 106 to the example DP 142. The example network 128 also allows the DP 142 to transmit the DP impression logs 144 to the AME 108. Additionally, the example network 128 allows an example television reporting unit 130 associated with devices of the example television platform 110 to transmit the example impression logs 112 to the example AME 108. The example network 128 may be a local area network, a wide area network, the Internet, a cloud, or any other type of communications network.

The impression requests 106 of the illustrated example include information about accesses to media on the example AME Panelist digital platforms 102 and/or the example DP subscriber digital platforms 104. In the illustrated example, devices in the AME panelist digital platforms 102 and/or the DP Subscriber digital platforms 104 execute monitoring instructions to generate the impression requests 106 associated with media when the media has been accessed. Example impression requests 106 allow monitoring entities, such as the AME 108 and the DP 142, to collect a number of media impressions for different media accessed via the AME panelist digital platforms 102 and/or the DP subscriber digital platforms 104. In the illustrated example, the devices in the AME panelist digital platforms 102 and the DP subscriber digital platforms 104 collectively form a total digital audience. By collecting media impressions, the AME 108 can determine a unique audience size and/or an impression count for different media items accessed by AME panelists of the AME panelist digital platforms 102 and/or accessed by DP subscribers of the DP subscriber digital platforms 104. The example impression requests 106 may include user and/or device identifiers as described below to identify users and/or devices associated with media accesses represented by the impression requests 106.

In some examples, media includes beacon instructions (or tag instructions) that, when executed by devices of the AME panelist digital platforms 102 and/or the example DP subscriber digital platforms 104, cause the devices to send the impression requests 106 to the example AME 108 (e.g., using HTTP requests). In some examples, the beacon instructions cause the devices of the AME panelist digital platforms 102 and/or the example DP subscriber digital platforms 104 to send device and/or user identifiers and media identifiers in the impression requests 106. Example device/user identifiers include cookies, hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), an Ad ID (e.g., an advertising ID introduced by Apple, Inc. for uniquely identifying mobile devices for purposes of serving advertising to such mobile devices), third-party service identifiers (e.g., advertising service identifiers, device usage analytics service identifiers, demographics collection service identifiers), etc. In some examples, multiple device/user identifier(s) may be sent by a client device in an impression request. The media identifiers (e.g., embedded identifiers, embedded codes, embedded information, signatures, etc.) enable the AME 108 to identify media accessed via devices of the AME panelist digital platforms 102 and/or the example DP subscriber digital platforms 104. In the illustrated example, the impression requests 106 cause the AME 108 and the DP 142 to log impressions for the media. In the illustrated example, an impression request is a reporting to the AME 108 or the DP 142 of an occurrence of media being presented at the AME panelist digital platforms 102 and/or the example DP Subscriber digital platforms 104. The impression requests 106 may be implemented as a hypertext transfer protocol (HTTP) request. However, whereas a transmitted HTTP request identifies a web site or other resource being requested for download from a server, the impression requests 106 include audience measurement information (e.g., media identifiers and device/user identifier). The AME 108 and/or the DP 142 to which the impression requests 106 are directed log(s) the audience measurement information of the impression requests 106 as impressions (e.g., media impressions such as advertisement impressions and/or media impressions depending on the nature of the media accessed via devices of the AME panelist digital platforms 102 and/or devices of the example DP subscriber digital platforms 104). In some examples, the AME 108 and/or the DP 142 may transmit a response based on receiving an impression request 106. However, a response to the impression request 106 is not necessary. It is sufficient for the AME 108 and/or the DP 142 to receive the impression request 106 to log a corresponding impression.

In the illustrated example, the example AME 108 does not provide the media to devices of the AME panelist digital platforms 102, devices of the DP subscriber digital platforms 104, and/or devices of the television platform 110 and is a trusted (e.g., neutral) third party (e.g., The Nielsen Company, LLC) for providing accurate media access (e.g., exposure) statistics. The example AME 108 monitors exposure to media via devices of the AME panelist digital platforms 102 based on the impression requests 106, devices of the DP subscriber digital platforms 104 based on the DP impression logs 144, and/or devices of the television platform 110 via the TV impression logs 112. In this manner, the example AME 108 can determine exposure metrics for different media based on the collected media measurement data. The example AME 108 monitors exposure to media based on the impression requests 106, the DP impression logs 144, the TV impression logs 112, and/or other monitoring techniques.

The example AME 108 includes the example cross-platform correction circuitry 122, the example TA database 124, and the example TA model 126. The example TA model 126 determines a total audience size for desktop, mobile, and TV platforms (e.g., the mobile platforms 114, 118, the desktop platforms 116, 120, and the television platform 110). The total audience sizes can be stored in the example TA database 124. As further disclosed herein, the example cross-platform correction circuitry 122 gathers merged datasets (e.g., platform audience sizes) from the TA database 124 to determine the platform audience sizes reported by the TA model 126, as described below. The example cross-platform correction circuitry 122 generates audience sizes for media accessed via devices of the platforms 110, 114, 116, 118, 120, at various levels of aggregation as described below.

Figure 2:
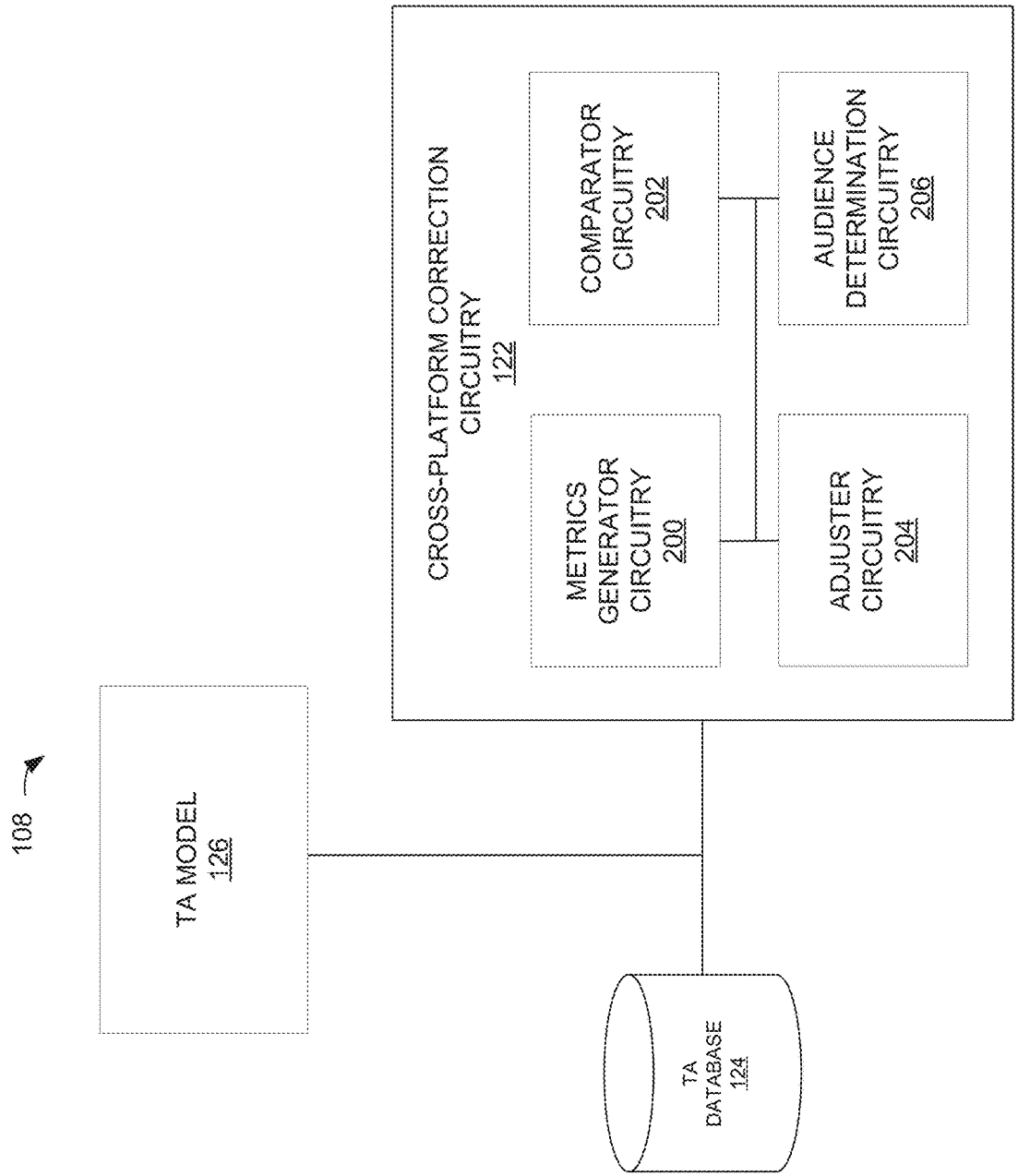
FIG. 2 is a block diagram of example cross-platform correction circuitry of FIG. 1.

FIG. 2 is a block diagram showing further detail of the example AME 108 of FIG. 1 to implement the cross-platform correction circuitry 122. The example TA model 126 accesses impression data (e.g., the impression requests 106, the DP impression logs 144, the TV impression logs 112 of FIG. 1) pertaining to media accessed via devices of the platforms 110, 114, 116, 118, 120. The example TA model 126 estimates audience sizes for each of the platforms (e.g., the platforms 110, 114, 116, 118, 120) based on impression data. The example TA model 126 stores the estimated audience sizes in the TA database 124. The example cross-platform correction circuitry 122 is in communication with the TA model 126 and the TA database 124 to access the estimated audience sizes for the platforms 110, 114, 116, 118, 120. The example cross-platform correction circuitry 122 utilizes the estimated audience sizes to determine a total audience size for a media item for each of the platforms (e.g., the platforms 110, 114, 116, 118, 120).

The example cross-platform correction circuitry 122 of FIG. 2 may be instantiated (e.g., creating an instance of, bring into being for any length of time, materialize, implement, etc.) by processor circuitry such as a central processing unit executing instructions. Additionally or alternatively, the cross-platform correction circuitry 122 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The example cross-platform correction circuitry 122 includes example metrics generator circuitry 200, example comparator circuitry 202, example adjuster circuitry 204, and example audience determination circuitry 206. The example metrics generator circuitry 200 generates audience sizes for media at various levels of aggregation. In some examples, the metrics generator circuitry 200 generates audience sizes at a multiple-TV-networks, multiple-websites level of aggregation (e.g., a multiple-networks/multiple-sites aggregation level) corresponding to media (e.g., a media item) accessed via multiple TV networks and accessed via multiple websites. In such examples, a multiple-TV-networks, multiple-websites aggregate-level audience size for a media item represents the quantity of people or audience members that accessed the media item via multiple TV networks and via multiple websites. In some examples, the metrics generator circuitry 200 generates audience sizes at a per-TV-network, multiple-websites level of aggregation (e.g., single-network/multiple-sites aggregation level) corresponding to media accessed via ones of the multiple TV networks and accessed via multiple websites. In such examples, a per-TV-network, multiple-websites aggregate-level audience size for a media item represents the quantity of people or audience members that accessed the media item via a single TV network and via multiple websites. In some examples, the metrics generator circuitry 200 generates audience sizes at a multiple-TV-networks, per-website level of aggregation (e.g., a multiple-networks/single-site aggregation level) corresponding to media accessed via multiple TV networks and accessed via ones of the multiple websites. In such examples, a multiple-TV-networks, per-website aggregate-level audience size for a media item represents the quantity of people or audience members that accessed the media item via multiple TV networks and via a single website. In some examples, the metrics generator circuitry 200 generates audience sizes at a per-TV-network, per-website level of aggregation (e.g., a single-network/single-site aggregation level) corresponding to media accessed via ones of the multiple TV networks and accessed via ones of the multiple websites. In such examples, a per-TV-network, per-website aggregate-level audience size for a media item represents the quantity of people or audience members that accessed the media item via a single TV network and via a single website.

The example comparator circuitry 202 compares audience sizes of a first level of aggregation (e.g., an across multiple TV networks and across multiple websites level of aggregation) to audience sizes of a second level of aggregation (e.g., an across multiple TV networks, per-website level of aggregation). In some examples, the comparator circuitry 202 compares audience sizes of a third level of aggregation (e.g., an across multiple TV networks and across multiple websites level of aggregation) to audience sizes of the first level of aggregation. In some examples, the comparator circuitry 202 compares audience sizes of a fourth level of aggregation (e.g., a per-TV-network, per-website level of aggregation) to audience sizes of the third level of aggregation. In some examples, the comparator circuitry 202 compares audience sizes of the fourth level of aggregation to audience sizes of the second level of aggregation. In some examples, the comparator circuitry 202 utilizes consistency rules to compare the audience sizes based on levels of aggregation, as described below in conjunction with FIGS. 14-19.

The example adjuster circuitry 204 reduces a first audience size based on a second audience size in response to the first audience size being greater than the second audience size. In some examples, the adjuster circuitry 204 increases the first audience size based on the second audience size in response to the first audience size being less than the second audience size.

The example audience determination circuitry 206 determines a total audience size for media (e.g., a media item) on a platform (e.g., the platforms 110, 114, 116, 118, 120) based on the first audience size and the second audience size. For example, the audience determination circuitry 206 can determine a total audience size for media on a mobile-only platform (e.g., the mobile platforms 114, 118 of FIG. 1). Additionally, the example audience determination circuitry 206 can determine a total audience size for media on at least one of a desktop-only platform, a TV-only platform, a TV & Desktop platform, a TV & Mobile platform, a Desktop & Mobile platform, and/or a TV & Desktop & Mobile platform.

The example metrics generator circuitry 200 send the audience sizes for the media platforms to the comparator circuitry 202 so that the comparator circuitry 202 can compare audience sizes for the different levels of aggregation. Based on the comparison(s) performed by the comparator circuitry 202, the example adjuster circuitry 204 can adjust (e.g., reduce, increase, etc.) the audience sizes generated by the metrics generator circuitry 200. The example audience determination circuitry 206 can determine a total audience size for at least one of the mobile platforms 114, 118, the desktop platforms 116, 120, and/or the TV platform 110. In some examples, the audience determination circuitry 206 utilizes the audience sizes adjusted (e.g., reduced, increased, etc.) by the adjuster circuitry 204.

Figure 3:
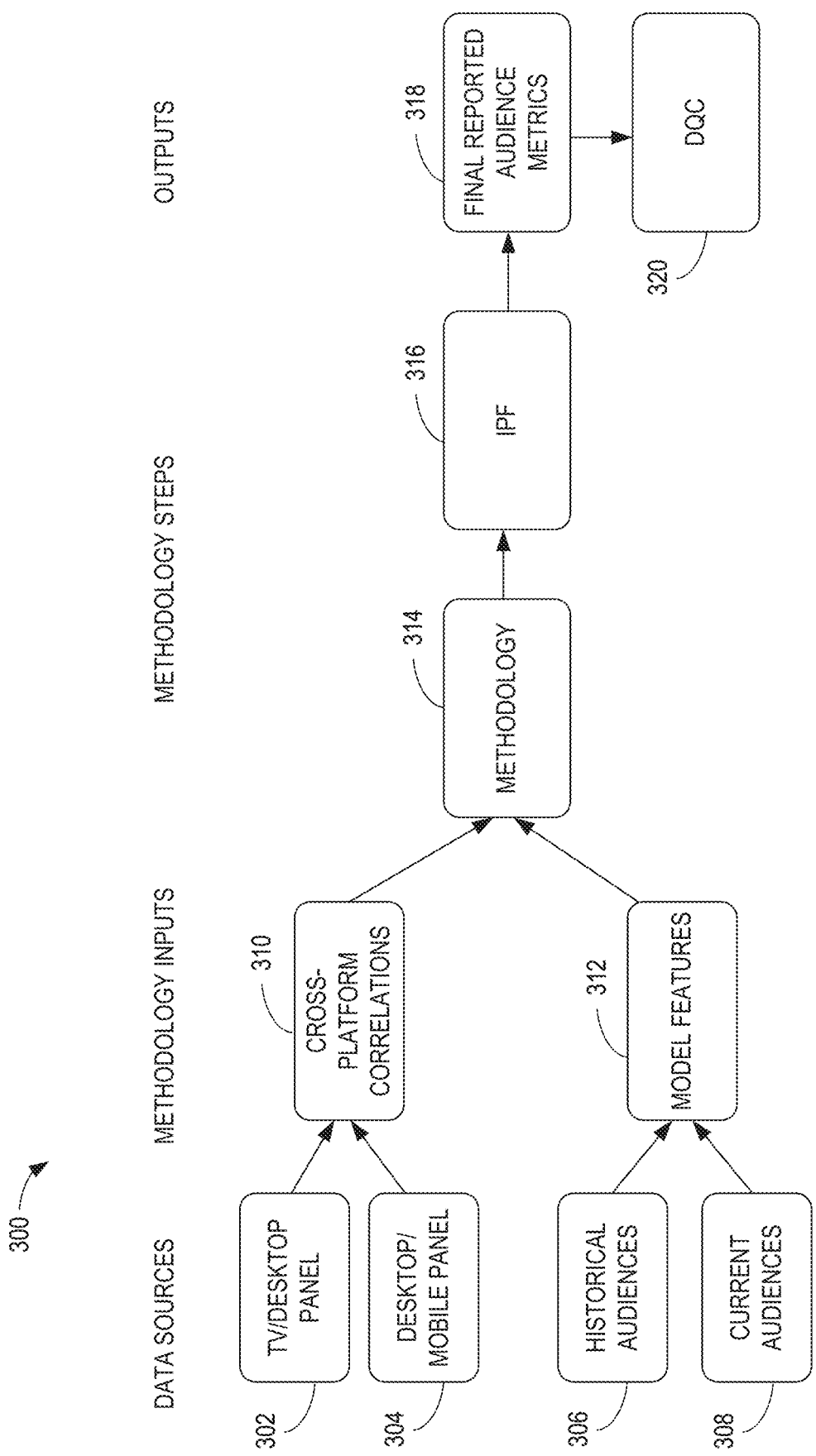
FIG. 3 is an example process flow to estimate total audience size.

FIG. 3 illustrates an example process flow 300 to determine total audience size. The example process flow 300 begins with collecting data from data sources including TV/Desktop panel data 302, Desktop/Mobile panel data 304, historical audience data 306, and current audience data 308. In particular, the TV/Desktop panel data 302 corresponds to audience sizes for media accessed via devices of TV platforms (e.g., the TV platforms 110 of FIG. 1) and desktop platforms (e.g., the desktop platforms 116, 120 of FIG. 1). Additionally or alternatively, the Desktop/Mobile panel data 304 corresponds to audience sizes for media accessed via devices of desktop platforms (e.g., the desktop platforms 116, 120) and mobile platforms (e.g., the mobile platforms 114, 118 of FIG. 1). In some examples the panel data 302, 304 can include TV/mobile panel data corresponding to audience sizes for media accessed via devices of TV platforms and mobile platforms. Additionally or alternatively, the example panel data 302, 304 can include TV/desktop/ mobile panel data for media accessed via devices of TV platforms, desktop platforms, and mobile platforms. In the illustrated example of FIG. 3, the cross-platform correction circuitry 122 (FIGS. 1 and 2) can use the panel data 302, 304 to generate example cross-platform correlations 310, as described below in connection with FIGS. 7 and 8. The example cross-platform correlations 310 can represent data accessed by both the desktop and mobile platforms (e.g., desktop/mobile panel data 304). In some examples, the cross-platform correlations 310 can represent data accessed by both the TV and desktop platforms (e.g., TV/desktop panel data 302).

In the illustrated example, processor circuitry (e.g., the processor circuitry 2212 of FIG. 22) can use the current audience data 308 and the historical audience data 306 to train a model (e.g., the model 126 of FIGS. 1 and 2) to estimate audience sizes. For example, in training the model 126, the processor circuitry uses the current audience data 308 and the historical audience data 306 to generate model features 312. The current audience data 308 and the historical audience data 306 of the illustrated example can include information about the audiences that is known by the AME 108 (FIG. 1). For example, the current audience data 308 and the historical audience data 306 can include known demographic data.

The example cross-platform correlations 310 and the model features 312 (e.g., production features) serve as inputs to an example methodology 314. The example methodology 314 can represent a machine learning model (e.g., multivariate regression model, random forest regression model, model 126, etc.). In some examples, the methodology 314 can produce total audience size estimates. In some examples, the methodology 314 (e.g., the model 126) is based on patterns and/or associations previously learned by the methodology 314 via a training process.

The example process 300 includes an iterative proportional fitting (IPF) operation 316. In some examples, the IPF operation 316 utilizes the total audience size estimates produced by the example methodology 314 to adjust (e.g., correct) the total audience size estimates based on the TV/desktop panel data 302 and/or the desktop/mobile panel data 304. In some examples, the IPF operation 316 adjusts the total audience size estimates from the methodology 314 to be substantially equivalent to an audience size of the TV/desktop panel data 302 and/or an audience size of the desktop/mobile panel data 304 corresponding to the TV, desktop, and/or mobile platforms. The adjusted total audience size estimates for the IPF operation 316 are shown as final reported audience metrics 318 in the illustrated example. In some examples, the final reported audience metrics 318 can represent total audience sizes for media accessed via devices of TV, desktop, and mobile platforms. The example process 300 includes a data quality check (DQC) operation 320 to finalize the final reported audience metrics 318.

Figure 4:
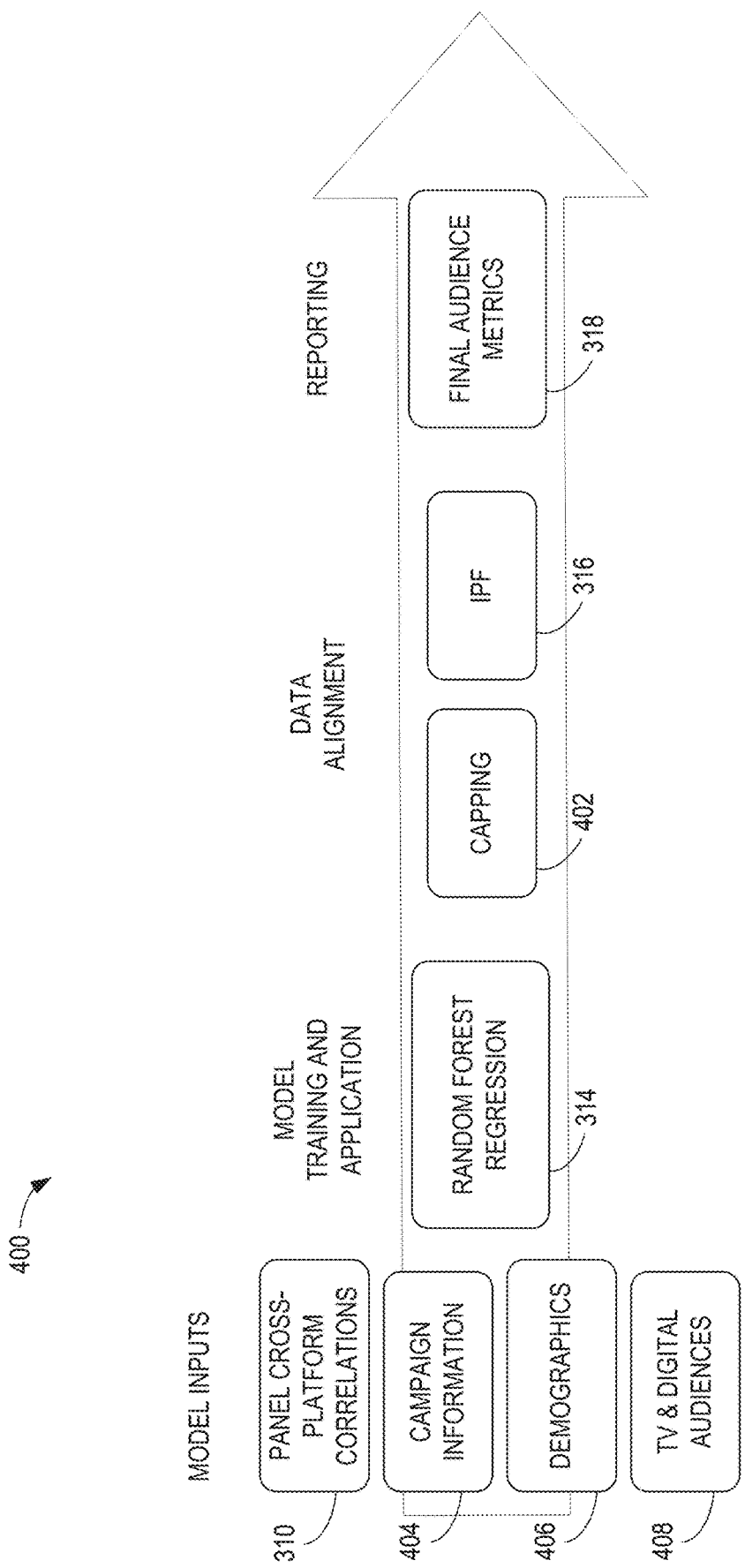
FIG. 4 is another example process flow to estimate total audience size.

FIG. 4 illustrates another example process flow 400 to determine total audience size. The example process flow 400 of FIG. 4 is similar to the process flow 300 of FIG. 3, but, instead, includes an example capping operation 402. In example FIG. 4, model inputs include the panel cross-platform correlations 310, campaign information 404, demographic information 406, and TV/Digital Audiences 408. The example campaign information 404 includes site category, network genre, network provider, time shared viewing (TSV) code, and/or aggregation code. The example demographic information 406 includes age and/or gender of audience members. The example TV/Digital Audiences 408 can represent the TV/Desktop panel data 302 and/or the Desktop/Mobile panel data 304. In the example of FIG. 4, the methodology 314 trains a random forest regression model. The example capping operation 402 implements the cross-platform correction circuitry 122 (FIGS. 1 and 2), as described below in conjunction with FIGS. 9-22. The example process 400 includes the IPF operation 316 and reporting of the final audience metrics 318 as described above in conjunction with FIG. 3.

Figure 5:
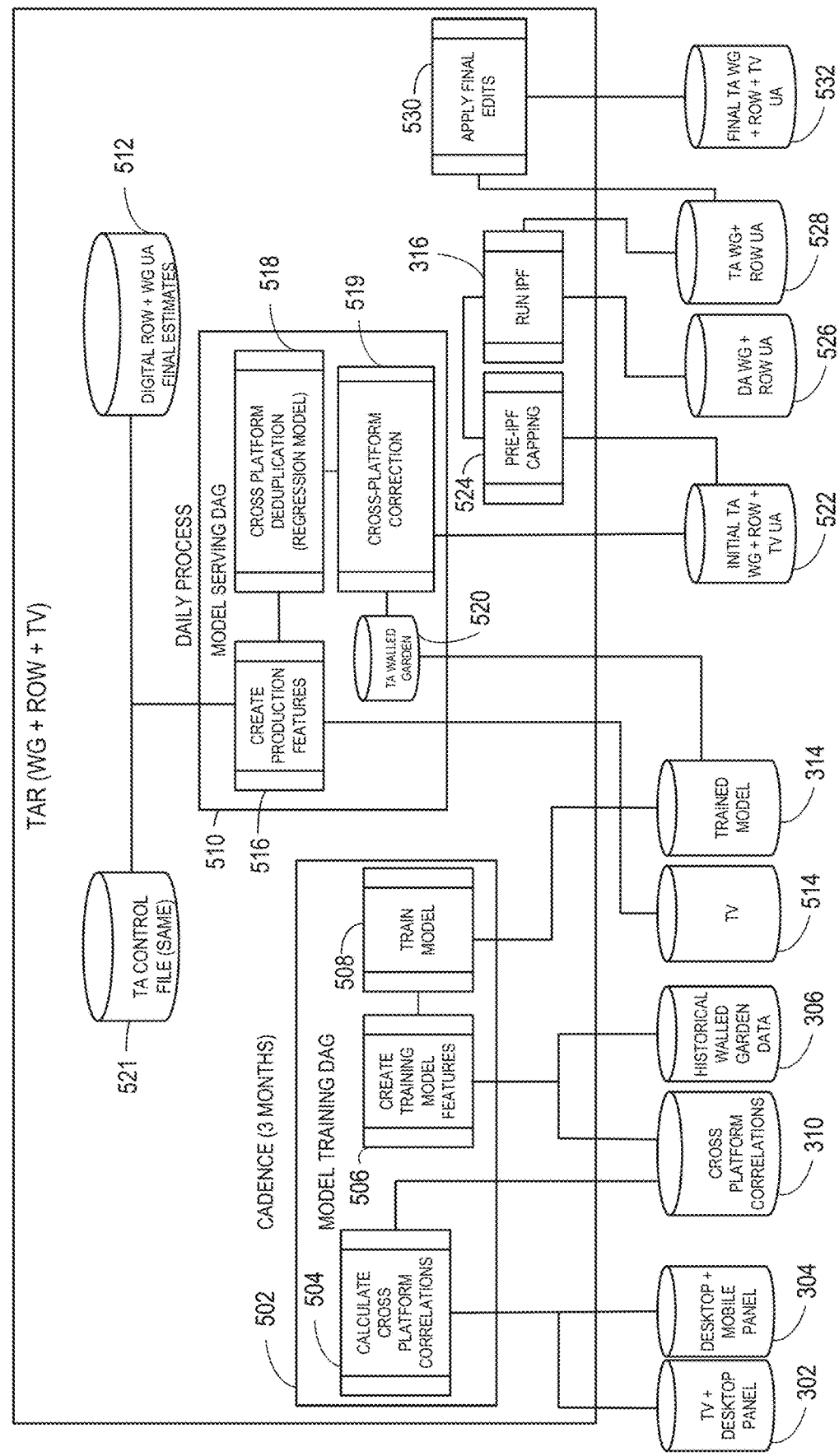
FIG. 5 illustrates a schematic of an example system that may be used to implement the example computer-based audience measurement system of FIG. 1 and/or the example process flows of FIGS. 3 and 4.

FIG. 5 illustrates an example system 500 that may be used to implement the computer-based audience measurement system 100 of FIG. 1 and/or the example process flows 300 of FIG. 3 and 400 of FIG. 4. In example FIG. 5, model inputs include the TV/desktop panel data 302, the desktop/mobile panel data 304, the panel cross-platform correlations 310, and the historical walled garden data 306. An example model training process 502 accesses the model inputs 302, 304, 310, 306 to train the model 314 (e.g., the methodology 314 of FIGS. 3 and 4, the random forest regression model generated by the methodology 314 in FIG. 4, the model 126 of FIGS. 1 and 2, etc.). The example model training process 502 includes calculating cross platform correlations 504, creating training model features 506, and training a model 508. In some examples, the model training process 502 occurs periodically (e.g., weekly, monthly, every 3 months, etc.) and/or aperiodically.

In FIG. 5, an example model serving process 510 includes inputs from digital audience estimates 512 (e.g., ROW unique audience (UA) size+WG UA size) and example TV audience estimates 514 (e.g., audience sizes from the television platform 110). The example model serving process 510 includes a create production features process 516, a cross-platform deduplication process 518 (e.g., using a regression model), the cross-platform correction process 519, and a TA walled garden database 520. In some examples, the model serving process 510 uses the create production features process 516 to generate production features such as the model features 312, as described above in conjunction with FIG. 3. In some examples, the model serving process 510 can use the create production features process 516 to generate production features corresponding to the campaign information 404 and/or the demographics information 406, as described above in conjunction with FIG. 4. In some examples, the create production features process 516 uses the cross-platform correlations 310 and/or the digital audience estimates 512. In some examples, the production features are located in a TA control file 521. The example cross-platform deduplication process 518 is performed via the trained model 314 to generate predicted audience sizes. In some example, the cross-platform correction process 519 is implemented by the example cross-platform correction circuitry 122 (FIGS. 1 and 2) determines an initial TA size 522 (e.g., WG UA size+ROW UA size+TV UA size, etc.) based on the predicted audience sizes, as described below in conjunction with FIGS. 9-19. The predicted audience sizes and the total audience sizes can be stored in the TA walled garden database 520.

In some examples, a pre-IPF capping process 524 utilizes the initial TA size 522 to ensure the audience estimates are consistent with the digital audience sizes 512 and the TV audiences 514. The example IPF operation 316 described above in in connection with FIG. 3 utilizes the initial TA size 522 to ensure the audience estimates are consistent with corresponding TV, Mobile, and desktop platforms. The example IPF operation 316 outputs estimates for digital advertisement (DA) measurements 526 (WG UA+ROW UA) and TA size 528 (WG UA+ROW UA) 528. In some examples, a final editing process 530 edits (e.g., applies final rules, processes unknown demographic buckets, corrects, organizes, etc.) the TA estimates 528 to produce a final TA size 532.

Figure 6:
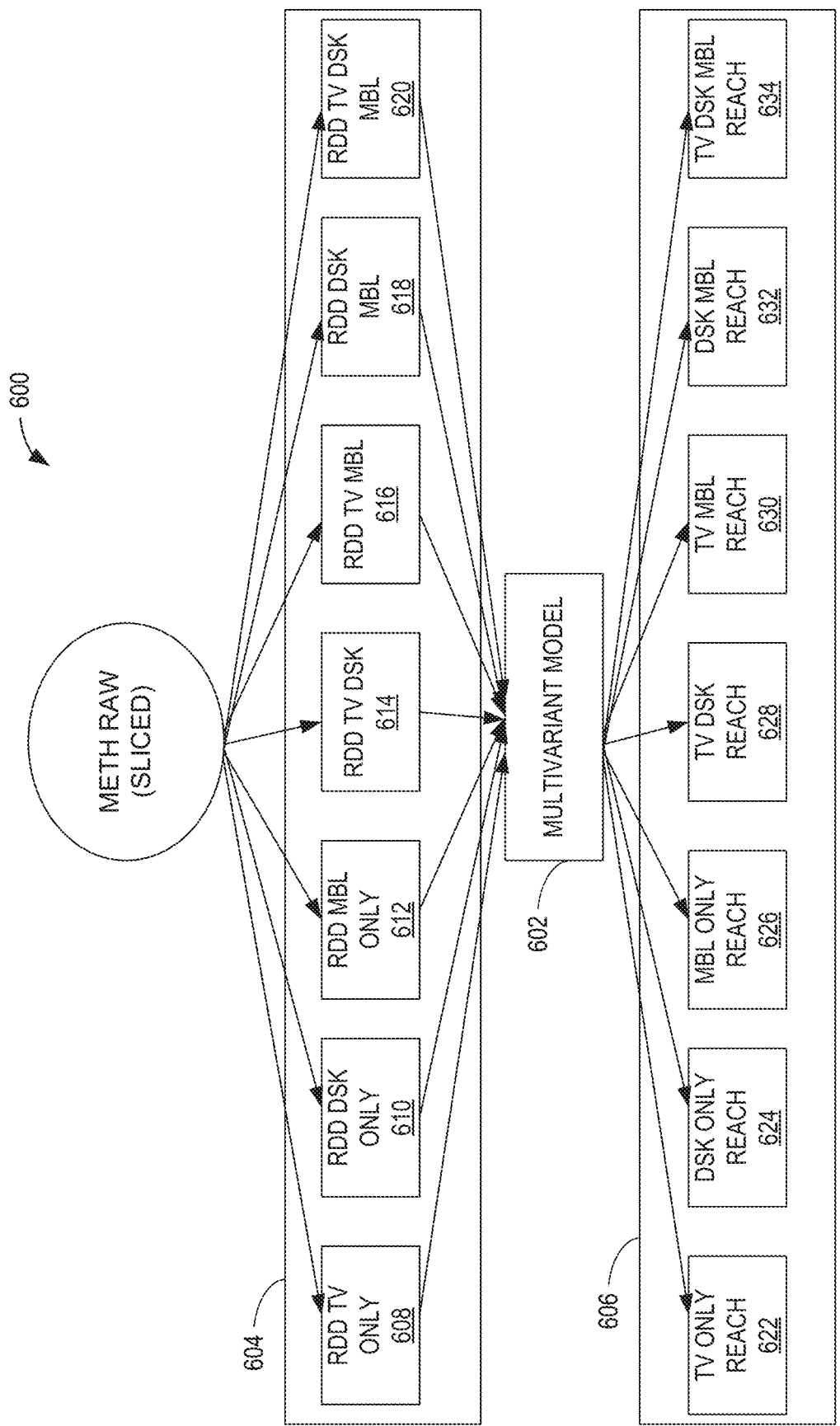
FIG. 6 illustrates an example schematic of an example multivariate multiple linear regression model to execute the example model of FIGS. 1, 3, 4, and 5.

FIG. 6 illustrates an example schematic 600 of an example multivariate multiple linear regression model 602 to implement the model 314 of FIGS. 3, 4, and 5. The example schematic includes features 604, the model 602, and predictions 606. The example features 604 include cross-platform correlations for TV, Mobile, and Desktop platforms. For examples, the cross-platform correlations include randomly deduplicated (RDD) TV-only correlations 608, RDD desktop-only correlations 610, RDD mobile-only correlations 612, RDD TV/desktop correlations 614, RDD TV/mobile correlations 616, RDD desktop/mobile correlations 618, and RDD TV/desktop/mobile correlations 620. In examples disclosed herein, a randomly deduplicated correlation is a correlation that represents a unique audience size for a particular platform (e.g., a TV-only platform, a desktop-only platform, a mobile-only platform, a TV/desktop platform, a TV/mobile platform, a desktop/mobile platform, and a TV/desktop/mobile platform). In some examples, the correlations 608, 610, 612, 614, 616, 618, 620 can be determined using equations 7-13 described below in connection with FIG. 9. The example multivariant model 602 utilizes the features 604 to generate the predictions 606. For example, the predictions 606 include predicted audience sizes (e.g., reach) for TV-only reach 622, desktop-only reach 624, mobile-only reach 626, TV/desktop reach 628, TV/mobile reach 630, desktop/mobile reach 632, and TV/desktop/mobile reach 634. In some examples, the capping operation 402 (FIG. 4) and/or the cross-platform correction circuitry 122 (FIGS. 1 and 2) can adjust (e.g., correct, reduce, increase, etc.) the predictions 606.

FIGS. 7 and 8 illustrate example correlation methodologies 700 and 800 to determine cross-platform correlations. Turning to FIG. 7, an example panelist viewing site diagram 702 includes a total population 704 that can view site A (e.g., a website A, or media on a website A) on a desktop-only platform 706 and a mobile-only platform 708. An amount of the total population 704 that can view site A on both the desktop-only platform 706 and the mobile-only platform 708 corresponds to the desktop/mobile platform 710. For the example correlation methodology 700, the example panelist viewing site diagram 702 is compared to an example panelist exposure to campaign diagram 712. The example panelist exposure to campaign diagram 712 includes panelist exposure to media (e.g., the campaign) on site A on a desktop-only platform 714 and on a mobile-only platform 716. An amount of the total population 704 exposed to the media on site A both on the desktop-only platform 714 and the mobile-only platform 716 corresponds to the desktop/mobile platform 718. The example correlation methodology 700 illustrates that an amount of the total population 704 that has viewed site A on the desktop/mobile platform 710 corresponds (e.g., proportionally equivalent) to the audiences of the desktop/mobile platform 718 that have been exposed to the media on site A.

In the example of FIG. 7, a correlation of the population of the desktop/mobile platform 718 exposed to the media on site A on the desktop-only platform 714 and the mobile-only platform 716 can be calculated. Example equations 1-6, described in detail below, represent an example correlation for the audience of the desktop/mobile platform 718.

$$p_1 = (\text{DSK UA})/(\text{Total Population}) \quad (1)$$

$$p_2 = (\text{MBL UA})/(\text{Total Population}) \quad (2)$$

$$p_{overlap} = (\text{MBL and DSK UA})/(\text{Total Population}) \quad (3)$$

$$p_d = (\text{MBL or DSK UA})/(\text{Total Population}) \quad (4)$$

$$n = (p_1 + p_2 - p_1 p_2) - p_d \quad (5)$$

$$\text{corr}_{DSK/MBL} = n/(n + 2(p_d - p_1)(p_d - p_2)) \quad (6)$$

In example equation 1 above, desktop-only reach ($p_1$) is determined as the unique audience size of the desktop-only platform 714 (DSK UA) divided by the total population 704. In example equation 2 above, mobile-only reach ($p_2$) is determined as the unique audience size of the mobile-only platform 716 (MBL UA) divided by the total population 704. In equation 3 above, the desktop/mobile reach ($p_{overlap}$) is determined as the unique audience size of the desktop/mobile platform 718 divided by the total population 704. In equation 4 above, the desktop and mobile reach (pa) is determined as the unioned (e.g., summed) audience size of the desktop-only platform 714, the mobile-only platform 716, and the desktop/mobile platform 718. In equation 5 above, the variable n is determined as the desktop-only reach ($p_d$) plus the mobile-only reach ($p_2$) minus the desktop-only reach ($p_1$) multiplied by the mobile-only reach ($p_2$) minus the desktop and mobile reach (pa). In equation 6 above, the desktop/mobile correlation ($\text{corr}_{DSK/MBL}$) is determined as the variable n divided by the sum of the variable n plus 2 multiplied by a quantity of the desktop and mobile reach ($p_d$) minus the desktop-only reach ($p_1$) and a quantity of the desktop and mobile reach (pa) minus the mobile-only reach ($p_2$). FIG. 8 illustrates the example correlation methodology 800 to determine cross-platform correlations. The example correlation methodology 800 of FIG. 8 is similar to the correlation methodology 700 of FIG. 7, but, instead, an example panelist viewing site diagram 702 includes a total population 704 that can view site B (e.g., a website B, or media on a website B) on a desktop-only platform 802 and a mobile-only platform 804. In FIG. 8, an amount of the total population 704 that can view site B on the mobile-only platform 804 also views site B on the desktop-only platform 802. For the example correlation methodology 800, the example panelist viewing site diagram 702 is compared to an example panelist exposure to campaign diagram 712. The example panelist exposure to campaign diagram 712 includes panelist exposure to media (e.g., the campaign) on site B on a desktop-only platform 806 and on a mobile-only platform 808. An amount of the total population 704 exposed to the media on site B on the mobile-only platform 808 is also exposed to the media on site B on the desktop-only platform 806. The example correlation methodology 800 illustrates that an amount of the total population 704 that has viewed site B on the mobile-only platform 804 corresponds (e.g., proportionally equivalent) to the mobile-only platform 808 audiences that have been exposed to the media on site B.

FIG. 9 illustrates an example data collection table 900 for multiple example aggregation levels to calculate total audience sizes across multiple example platforms. The example aggregation levels include a per-site for a single-network aggregation level 902 (e.g., a site/network aggregation level 902), an across multiple (mult) sites, per-network aggregation level 904 (e.g., a mult sites/network aggregation level 904), a per-site across multiple networks aggregation level 906 (e.g., a site/mult networks aggregation level 906), and an across multiple sites and across multiple networks aggregation level 908 (e.g., a mult sites/mult networks aggregation level 908). The example platforms include TV-only 910, desktop-only 912, mobile-only 914, TV/desktop 916, TV/mobile 918, desktop/mobile 920, and TV/desktop/mobile 922. In the example of FIG. 9, audience sizes are generated for each of the aggregation levels 902, 904, 906, 908 across each of the platforms 910, 912, 914, 916, 918, 920, 922. The example of FIG. 9 illustrates audience sizes for media appearing on three example sites (e.g., an Instagram website, a YouTube website, a something.com website) and two example TV networks (e.g., an ABC TV network, a CBS TV network).

The example site/network aggregation level 902 can represent a first level of aggregation. For example, the example site/network aggregation level 902 includes audience sizes for media access on a TV network (e.g., ABC or CBS) and accessed on a site (e.g., Instagram, YouTube, or something.com) for each of the media platforms 910, 912, 914, 916, 918, 920, 922. An example cell 924 stores a value representing an audience size for a media item accessed via devices of the TV-only platform 910 by accessing the media item on the ABC network and on the Instagram website. An example cell 926 stores a value representing an audience size for a media item accessed via devices of the desktop-only platform 912 by accessing the media item on the ABC network and on the YouTube website. As such, the first level of aggregation 902 includes audience sizes for media provided by each of the media networks (e.g., the ABC TV network or the CBS TV network) and accessed on each of the sites (e.g., the Instagram website, the YouTube website, or the something.com website) for each of the media platforms 910, 912, 914, 916, 918, 920, 922.

The example mult sites/network aggregation level 904 can represent a second level of aggregation. For example, the example mult sites/network aggregation level 904 includes audience sizes for media accessed on each of the TV networks (e.g., the ABC TV network or the CBS TV network) and accessed on multiple sites (e.g., the Instagram website, the YouTube website, and the something.com website) for each of the media platforms 910, 912, 914, 916, 918, 920, 922. An example cell 928 stores a value representing an audience size for a media item accessed via devices of the TV-only platform 910 by accessing the media on the ABC TV network and on the Instagram website, the YouTube website, and the something.com website. An example cell 930 stores a value representing an audience size for a media item accessed via devices of the desktop-only platform 912 by accessing the media item on the CBS TV network and on the Instagram website, the YouTube website, and the something.com website. As such, the second level of aggregation 904 includes audience sizes for media accessed on each of the TV networks (e.g., ABC or CBS) and accessed on multiple sites (e.g., the Instagram website, the YouTube website, and the something.com website) for each of the media platforms 910, 912, 914, 916, 918, 920, 922.

The example site/mult networks aggregation level 906 can represent a third level of aggregation. For example, the example site/mult networks aggregation level 906 includes audience sizes for media accessed on multiple TV networks (e.g., the ABC TV network and the CBS TV network) and accessed on multiple sites (e.g., the Instagram website, the YouTube website, or the something.com website) for each of the media platforms 910, 912, 914, 916, 918, 920, 922. An example cell 932 stores a value representative of an audience size for a media item accessed via devices of the TV-only platform 910 by accessing the media item on the ABC TV network and the CBS TV network and accessed on the Instagram website. An example cell 934 stores a value representing an audience size for a media item access via devices of the desktop-only platform 912 by accessing the media item on the ABC TV network and the CBS TV network and on the YouTube website. As such, the third level of aggregation 906 includes audience sizes for media access on multiple TV networks (e.g., the ABC TV network and the CBS TV network) and accessed on each of the sites (e.g., the Instagram website, the YouTube website, or the something.com website) for each of the media platforms 910, 912, 914, 916, 918, 920, 922.

The example mult sites/mult networks aggregation level 908 can represent a fourth level of aggregation. For example, the example mult sites/mult networks aggregation level 908 includes audience sizes for media access on multiple TV networks (e.g., the ABC TV network and the CBS TV network) and accessed multiple sites (e.g., the Instagram website, the YouTube website, and the something.com website) for each of the media platforms 910, 912, 914, 916, 918, 920, 922. An example cell 936 stores a value representative of an audience size for a media item accessed via devices of the TV-only platform 910 by accessing the media item on the ABC TV network and the CBS TV network and on the Instagram website, the YouTube website, and the something.com website. An example cell 938 stores a value representing an audience size for a media item accessed via devices of the desktop-only platform 912 by accessing the media item on the ABC TV network and the CBS TV network and on the Instagram website, the YouTube website, and the something.com website. As such, the fourth level of aggregation 908 includes audience sizes for media access on multiple TV networks (e.g., the ABC TV network, the CBS TV network) and accessed on multiple sites (e.g., the Instagram website, the YouTube website, the something.com website) for each of the media platforms 910, 912, 914, 916, 918, 920, 922.

Randomly deduplicated audiences can be calculated for each of the media platforms 910, 912, 914, 916, 918, 920, 922 using example equations 7-13 below. Example equations 7-13, outlined below, represent calculations for each of the deduplicated audiences.

$$tv\_only\_audience = (tv\_reach) * (1-(digital\_reach)) * universe\_estimate \quad (7)$$

$$desktop\_only\_audience = (1-(tv\_reach)) * ((digital\_reach)-(mobile\_reach)) * universe\_estimate \quad (8)$$

$$mobile\_only\_audience = (1-(tv\_reach)) * ((digital\_reach)-(desktop\_reach)) * universe\_estimate \quad (9)$$

$$tv\_desktop\_only\_audience = (tv\_reach) * ((digital\_reach)-(mobile\_reach)) * universe\_estimate \quad (10)$$

$$tv\_mobile\_only\_audience = (tv\_reach) * ((digital\_reach)-(desktop\_reach)) * universe\_estimate \quad (11)$$

$$desktop\_mobile\_only\_audience = (1-(tv\_reach)) * ((desktop\_reach)+(mobile\_reach)-(digital\_reach)) * universe\_estimate \quad (12)$$

$$tv\_desktop\_mobile\_audience = (tv\_reach) * ((desktop\_reach)+(mobile\_reach)-(digital\_reach)) * universe\_estimate \quad (13)$$

An example deduplicated audience for the TV-only platform 910 can be determined using the example equation 7. An example deduplicated audience for the desktop-only platform 912 can be determined using the example equation 8. An example deduplicated audience for the mobile-only platform 914 can be determined using the example equation 9. An example deduplicated audience for the TV/desktop platform 916 can be determined using the example equation 10. An example deduplicated audience for the TV/mobile platform 918 can be determined using the example equation 11. An example deduplicated audience for the desktop/mobile platform 920 can be determined using the example equation 12. An example deduplicated audience for the TV/desktop/mobile platform 922 can be determined using the example equation 13.

In some examples, the audience sizes collected for each of the media platforms 910, 912, 914, 916, 918, 920, 922 can be inconsistent estimates when comparing the levels of aggregation 902, 904, 906, 908. For example, the audience size represented by cell 924 (media accessed on the ABC TV network and accessed on the Instagram website) should be less than the audience size represented by cell 932 (media access on the ABC TV network and the CBS TV network and accessed on the Instagram website). In some examples, inconsistencies in audience sizes for the levels of aggregation 902, 904, 906, 908 can be adjusted (e.g., corrected, reduced, increased, etc.), as described below in conjunction with FIGS. 10-22.

Figure 10:
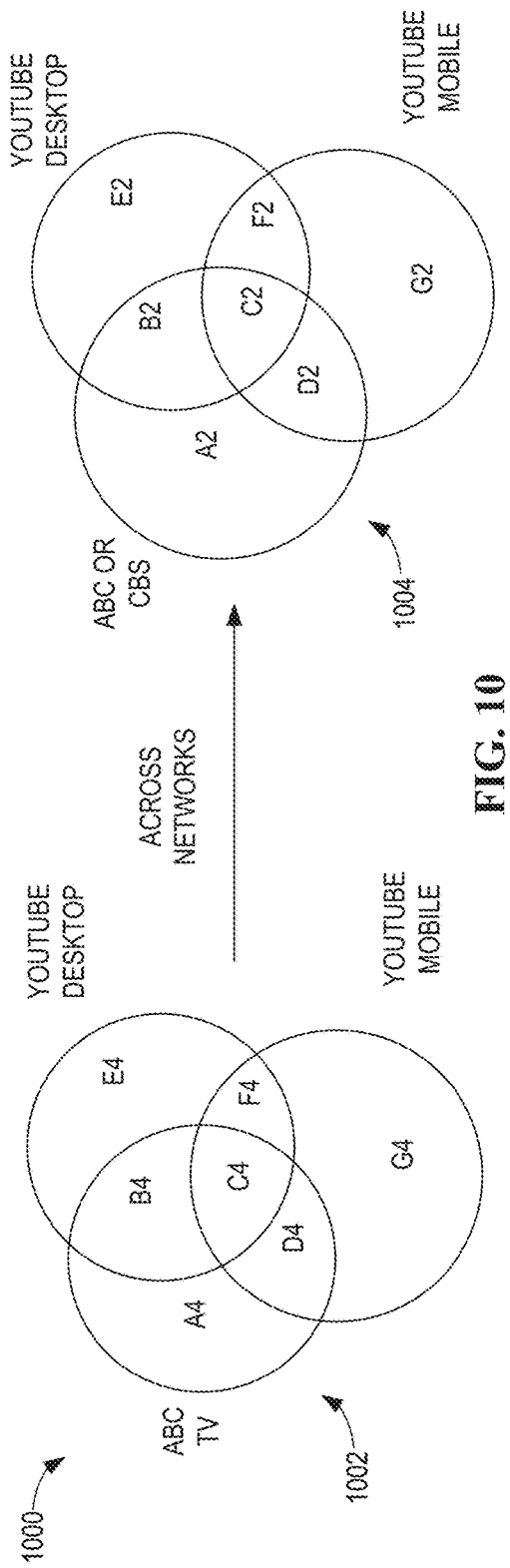
FIGS. 10-13 illustrate example diagrams to compare the example aggregation levels of FIG. 9.

FIGS. 10-13 illustrate example comparisons based on the aggregation levels 902, 904, 906, 908 of FIG. 9 to determine total audience sizes. Turning to FIG. 10, example comparison 1000 includes an example diagram 1002 representing the site/network level of aggregation 902 and an example diagram 1004 representing the site/mult networks level of aggregation 906. The example diagram 1002 includes an audience size A4 for the TV-only platform 910, an audience size E4 for the desktop-only platform 912, and audience size G4 for the mobile-only platform 914. The example diagram 1002 also includes audience size B4 for the TV/desktop platform 916, audience size F4 for the desktop/mobile platform 920, audience size D4 for the TV/mobile platform 918, and audience size C4 for the TV/desktop/mobile platform 922.

The example diagram 1004, representing the site/mult networks level of aggregation 906, includes an audience size A2 for the TV-only platform 910, an audience size E2 for the desktop-only platform 912, and audience size G2 for the mobile-only platform 914. The example diagram 1002 also includes audience size B2 for the TV/desktop platform 916, audience size F2 for the desktop/mobile platform 920, audience size D2 for the TV/mobile platform 918, and audience size C2 for the TV/desktop/mobile platform 922.

The example comparison 1000 of FIG. 10 compares the site/network level of aggregation 902 and the site/mult networks level of aggregation 906 to ensure the audience sizes A4, B4, C4, D4, E4, F4, and G4 are consistent with the audience sizes A2, B2, C2, D2, E2, F2, and G2. In some examples, the comparison 100 includes consistency rules to adjust (e.g., correct, reduce, increase) the audience sizes A4, B4, C4, D4, E4, F4, and/or G4 based on the audience sizes A2, B2, C2, D2, E2, F2, and/or G2, as described below in conjunction with FIGS. 14-16.

Figure 11:
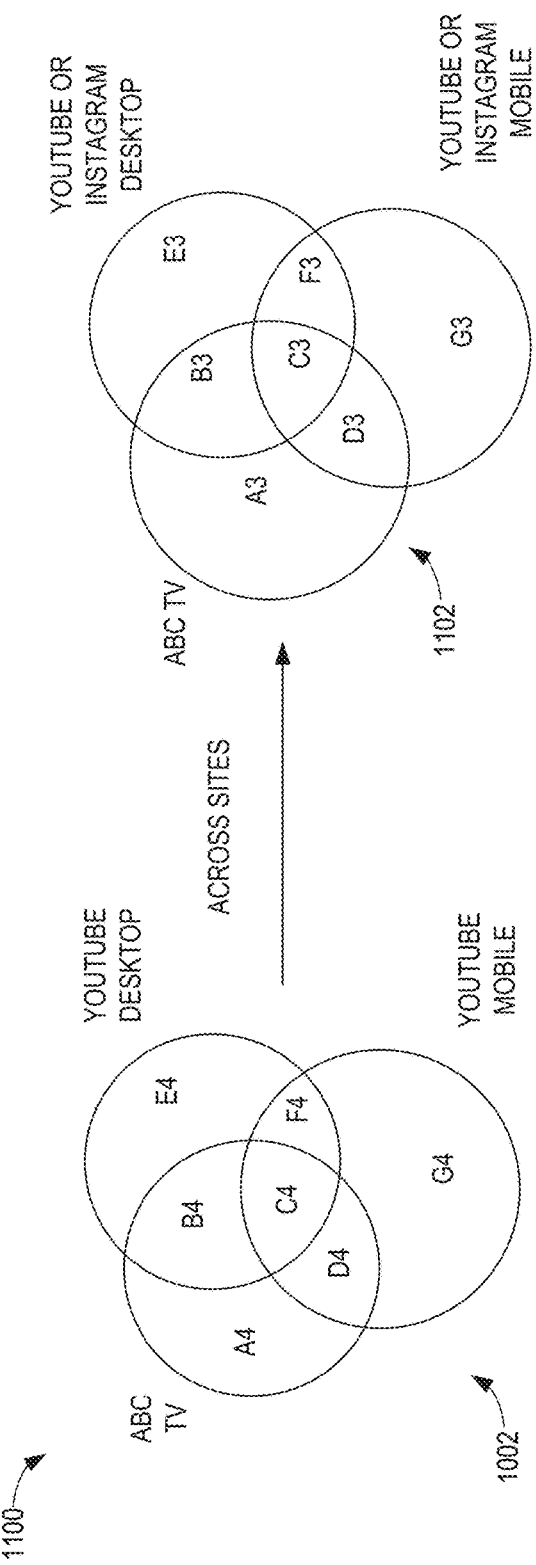

Turning to FIG. 11, an example comparison 1100 includes the example diagram 1002 representing the site/network level of aggregation 902 and an example diagram 1102 representing the mult sites/network level of aggregation 904. The example diagram 1102 includes an audience size A3 for the TV-only platform 910, an audience size E3 for the desktop-only platform 912, and audience size G3 for the mobile-only platform 914. The example diagram 1102 includes audience size B3 for the TV/desktop platform 916, audience size F3 for the desktop/mobile platform 920, audience size D3 for the TV/mobile platform 918, and audience size C3 for the TV/desktop/mobile platform 922.

The example comparison 1100 of FIG. 11 compares the site/network level of aggregation 902 and the mult sites/network level of aggregation 904 to ensure the audience sizes A4, B4, C4, D4, E4, F4, and G4 are consistent with the audience sizes A3, B3, C3, D3, E3, F3, and G3. In some examples, the comparison 1100 includes consistency rules to adjust (e.g., correct, reduce, increase) the audience sizes A4, B4, C4, D4, E4, F4, and/or G4 based on the audience sizes A3, B3, C3, D3, E3, F3, and G3, as described below in conjunction with FIGS. 14-16.

Figure 12:
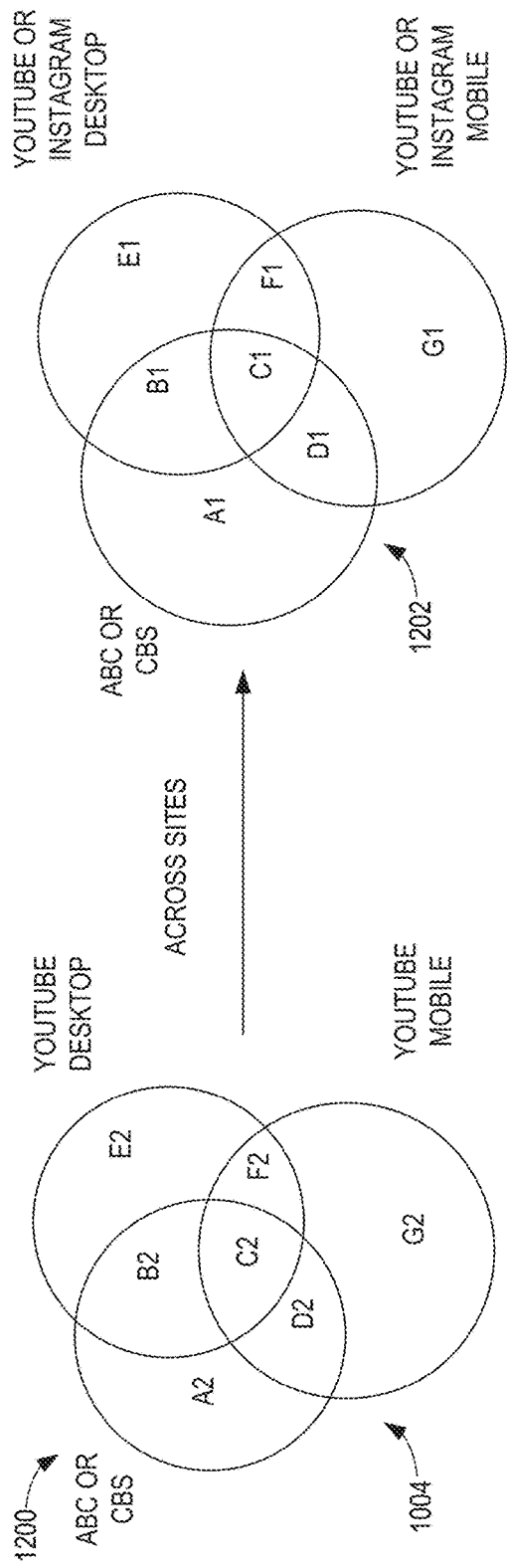

Turning to FIG. 12, an example comparison 1200 includes the example diagram 1004 of FIG. 10 representing the site/mult networks level of aggregation 906 and an example diagram 1202 representing the mult sites/mult networks level of aggregation 908. The example diagram 1202 includes an audience size A1 for the TV-only platform 910, an audience size E1 for the desktop-only platform 912, and audience size G1 for the mobile-only platform 914. Additionally or alternatively, the example diagram 1102 includes audience size B1 for the TV/desktop platform 916, audience size F1 for the desktop/mobile platform 920, audience size D1 for the TV/mobile platform 918, and audience size C1 for the TV/desktop/mobile platform 922.

The example comparison 1200 of FIG. 12 compares the site/mult networks level of aggregation 906 and the mult sites/mult networks level of aggregation 908 to ensure the audience sizes A2, B2, C2, D2, E2, F2, and G2 are consistent with the audience sizes A1, B1, C1, D1, E1, F1, and G1. In some examples, the comparison 1200 includes consistency rules to adjust (e.g., correct, reduce, increase) the audience sizes A2, B2, C2, D2, E2, F2, and/or G2 based on the audience sizes A1, B1, C1, D1, E1, F1, and/or G1, as described below in conjunction with FIGS. 14-16.

Figure 13:
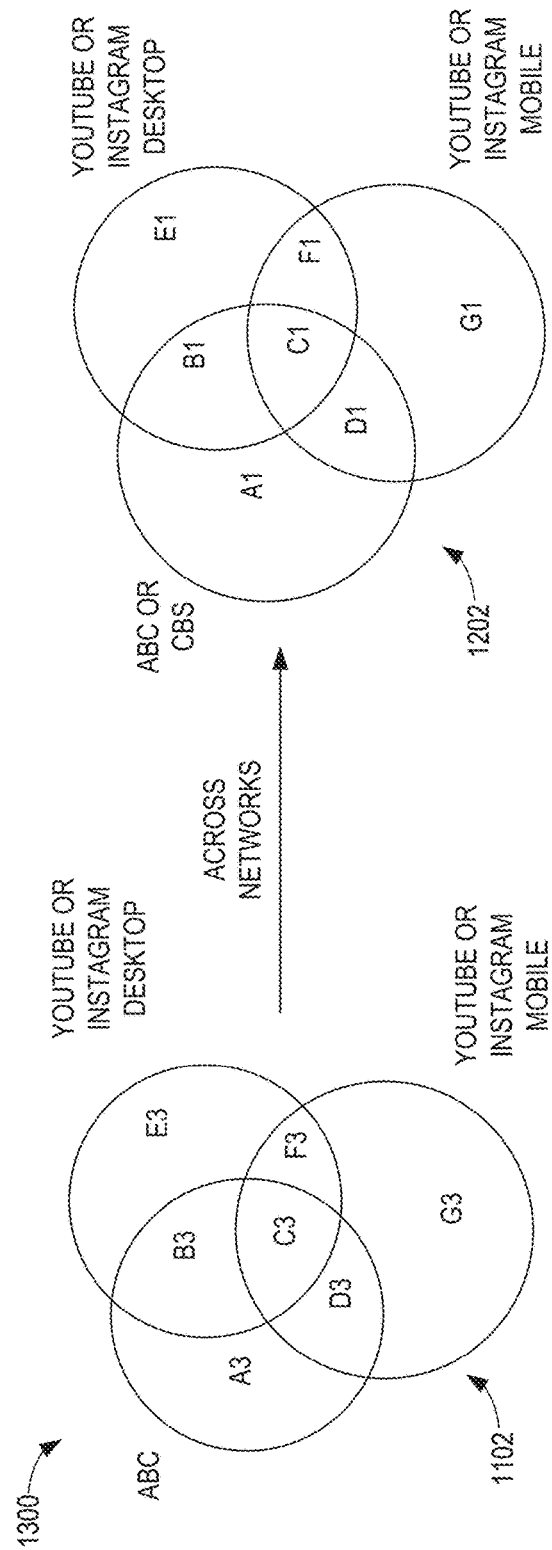

Turning to FIG. 13, an example comparison 1300 includes the example diagram 1102 of FIG. 11 representing the mult sites/network level of aggregation 904 and the example diagram 1202 representing the mult sites/mult networks level of aggregation 908. The example comparison 1300 of FIG. 13 compares the site/mult networks level of aggregation 906 and the mult sites/mult networks level of aggregation 908 to ensure the audience sizes A3, B3, C3, D3, E3, F3, and G3 are consistent with the audience sizes A1, B1, C1. D1, E1, F1, and G1. In some examples, the comparison 1300 includes consistency rules to adjust (e.g., correct, reduce, increase) the audience sizes A3, B3, C3, D3, E3, F3, and/or G3 based on the audience sizes A1, B1, C1, D1, E1, F1, and/or G1, as described below in conjunction with FIGS. 14-16.

FIGS. 14-16 illustrate example consistency rules for performing the example comparisons 1000, 1100, 1200, 1300 of FIGS. 10-13. Turning to FIG. 14, example consistency rules 1400 represent the TV-only platform 910. For example, the consistency rules 1400 include requirements for the audience sizes A1, A2, A3, and A4 and capping adjustments for audience sizes A2 and A3. The example consistency rules 1400 can require the audience size A1 to be less than or equal to the audience size A2 (e.g., A1<=A2) and/or can require the audience size A1 to be greater than or equal to the audience size A3 (e.g., A1>=A3). For example, audience size A1 represents an audience size for multiple TV networks (e.g., the ABC TV network and the CBS TV network) and audience size A3 represents an audience size for one of the TV networks (e.g., the ABC TV network). If the audience size A3 is greater than the audience size A1, then the audience size estimate is inconsistent because it does not satisfy the requirement that the audience size A1 be greater than or equal to the audience size A3 (e.g., A1>=A3). In some examples, the audience size A3 can be adjusted (e.g., reduced) by the cross-platform correction circuitry 122 (FIGS. 1 and 2), as described below in conjunction with FIG. 25.

The example consistency rules 1400 include capping adjustments for audience sizes A2 and A3. For example, the audience size A2 (e.g., an audience size of the ABC TV network and the CBS TV network) can be required to equal a maximum (e.g., a greatest audience size) of the audience sizes A1 (e.g., an audience size of the ABC TV network and the CBS TV network) and A4 (e.g., an audience size of the ABC TV network). As such, the audience size A2 can equal the audience size A1. Additionally or alternatively, the audience size A3 (e.g., an audience size of the ABC TV network) can be required to equal a minimum (e.g., a least audience size) of the audience sizes A1 (e.g., an audience size of the ABC TV network and the CBS TV network) and A4 (e.g., an audience size of the ABC TV network). As such, the audience size A3 can equal the audience size A4. In some examples, the cross-platform correction circuitry 122 adjusts (e.g., increases) the audience size A2 based on the audience sizes A2 and/or A4. In some examples, the cross-platform correction circuitry 122 adjusts (e.g., reduces) the audience size A3 based on the audience sizes A1 and/or A4.

Turning to FIG. 15, example consistency rules 1500 represent the TV/desktop/mobile platform 922. For example, the consistency rules 1500 include requirements for the audience sizes B1, C1, D1, B2, C2, D2, B3, C3, D3, B4, C4, and D4 and capping adjustments for audience sizes B1, C1, D1 and B4, C4, D4. The example consistency rules 1500 can require a summation of the audience size B3+C3+D3 to be less than or equal to a summation of the audience size B1+C1+D1. For example, audience size B3+C3+D3 represents a summation of audience members of audience sizes B3, C3, D3. For example, audience members represented by audience size B3 accessed media via first devices of the TV-only platform 910 and second devices of the desktop-only platform 912 for a single TV network (e.g., the ABC TV network). Additionally or alternatively, the audience size B1+C1+D1 represents a summation of audience members of audiences sizes B1, C1, D1. For example, audience members represented by audience size B1 accessed media via the first devices of the TV-only platform 910 and the second devices of the desktop-only platform 912 for multiple TV networks (e.g., the ABC TV network and the CBS TV network). If the audience size B3+C3+D3 is greater than the audience size B1+C1+D1, then the audience size estimate is inconsistent because it does not satisfy the requirement that a summation of the audience size B3+C3+D3 be less than or equal to a summation of the audience size B1+C1+D1. In some examples, the audience size B3+C3+D3 can be adjusted (e.g., reduced) by the cross-platform correction circuitry 122 as described below in conjunction with FIG. 25.

The example consistency rules 1500 include capping adjustments for audience sizes B1+C1+D1 and B4+C4+D4. For example, the audience size B1+C1+D1 (e.g., an audience size of the ABC TV network and the CBS TV network) can be required to equal a maximum (e.g., a greatest or largest audience size) of the audience sizes B2+C2+D2 (e.g., an audience size of the ABC TV network and CBS TV network) and B3+C3+D3 (e.g., an audience size of the ABC TV network). As such, the audience size B1+C1+D1 can equal the audience size B2+C2+D2. Additionally or alternatively, the audience size B4+C4+D4 (e.g., an audience size of the ABC TV network) can be required to equal a minimum (e.g., a least or smallest audience size) of the audience sizes B2+C2+D2 (e.g., an audience size of the ABC TV network and the CBS TV network) and B3+C3+D3 (e.g., an audience size of the ABC TV network). As such, the audience size B4+C4+D4 can equal the audience size B3+C3+D3. In some examples, the cross-platform correction circuitry 122 adjusts (e.g., increases) the audience size B1+C1+D1 based on the audience sizes B2+C2+D2 and/or B3+C3+D3. In some examples, the cross-platform correction circuitry 122 adjusts (e.g., reduces) the audience size B4+C4+D4 based on the audience sizes B2+C2+D2 and/or B3+C3+D3.

Turning to FIG. 16, example consistency rules 1600 represent the desktop/mobile platform 920. For example, the consistency rules 1500 include requirements for the audience sizes E1, F1, G1, E2, F2, G2, E3, F3, G3, E4. F4, and G4 and capping adjustments for audience sizes B1, C1, D1 and B4, C4, D4. The example consistency rules 1600 can require a summation of the audience size E2+F2+G2 to be less than or equal to a summation of the audience size E1+F1+G1. For example, audience size E2+F2+G2 represents a summation of audience sizes E2, F2, G2 shown for the overlaps of TV network, desktop website, and mobile website in the diagram 1004 for multiple networks (e.g., the ABC TV network and the CBS TV network), and audience size E1+F1+G1 represents a summation of audience sizes E1, F1, G1 shown for overlaps of TV network, desktop website, and mobile website in the diagram 1202 for multiple networks (e.g., the ABC TV network and the CBS TV network). If the audience size E2+F2+G2 is greater than the audience size E1+F1+G1, then the audience size estimate is inconsistent because it does not satisfy the requirement that a summation of the audience size E2+F2+G2 be less than or equal to a summation of the audience size E1+F1+G1. In some examples, the audience size E2+F2+G2 can be adjusted (e.g., reduced) by the cross-platform correction circuitry 122, further described in conjunction with FIG. 25.

The example consistency rules 1600 include capping adjustments for audience sizes E2+F2+G2 and E3+F3+G3. For example, the audience size E2+F2+G2 (e.g., an audience size of the YouTube website) can be required to equal a minimum (e.g., a least or smallest audience size) of the audience sizes E1+F1+G1 (e.g., an audience size of the YouTube website and the Instagram website) and E4+F4+ G4 (e.g., and audience size of the YouTube website). As such, the audience size E2+F2+G2 can equal the audience size E4+F4+G4. Additionally or alternatively, the audience size E3+F3+G3 (e.g., an audience size of the YouTube website and the Instagram website) can be required to equal a maximum (e.g., a greatest or largest audience size) of the audience sizes E1+F1+G1 (e.g., an audience size of the YouTube website and the Instagram website) and E4+F4+ G4 (e.g., an audience size of the YouTube website). As such, the audience size E3+F3+G3 can equal the audience size E1+F1+G1. In some examples, the cross-platform correction circuitry 122 adjusts (e.g., reduces) the audience size E2+F2+G2 based on the audience sizes E1+F1+G1 and/or E4+F4+G4. In some examples, the cross-platform correction circuitry 122 adjusts (e.g., increases) the audience size E3+F3+G3 based on the audience sizes E1+F1+G1 and/or E4+F4+G4.

Figure 17:
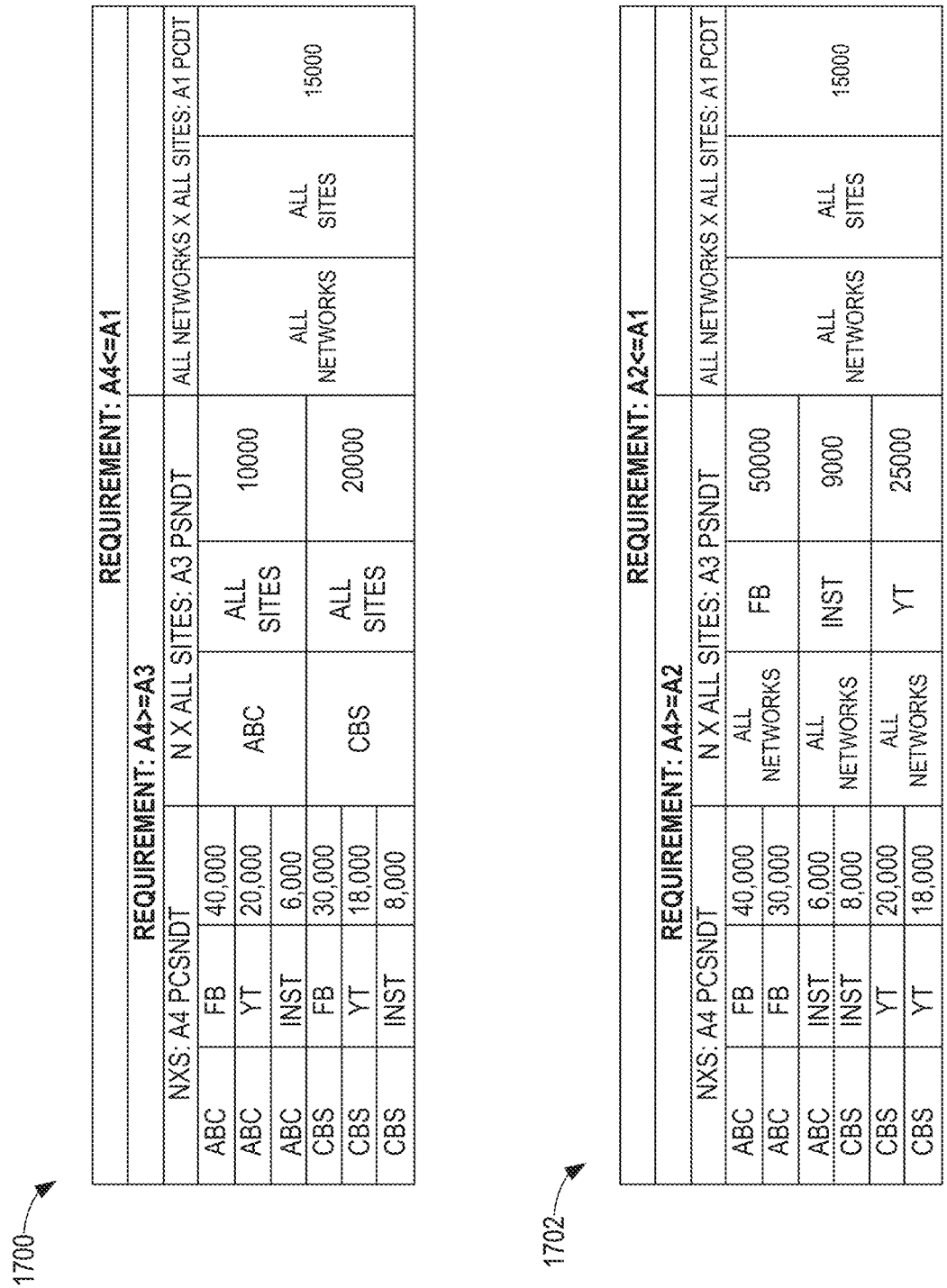

FIGS. 17-19 represent example datasets with example audience size values in association with the consistency rules of FIGS. 14-16. Turning to FIG. 17, example datasets 1700, 1702 represent the audience sizes for the TV-only platform 910 (FIG. 9). In particular, the example dataset 1700 represents the audience sizes A4, A3, and A1 and the consistency rules 1400 (FIG. 14). The example dataset 1702 represents the audience sizes A4, A2, and A1 and the consistency rules 1400.

Turning to FIG. 18, example datasets 1800, 1802 represent the audience sizes for the TV/desktop/mobile platform 922 (FIG. 9). In particular, the example dataset 1800 represents the audience sizes B4+C4+D4, B3+C3+D3, and B1+C1+D1 and the consistency rules 1500 (FIG. 15). Additionally or alternatively, the example dataset 1802 represents the audience sizes B4+C4+D4, B2+C2+D2, B1+C1+D1 and the consistency rules 1500.

Turning to FIG. 19, example datasets 1900, 1902 represent the audience sizes for the desktop/mobile platform 920 (FIG. 9). In particular, the example dataset 1900 represents the audience sizes E4+F4+G4, E3+F3+G3, and E1+F1+G1 and the consistency rules 1600 (FIG. 16). The example dataset 1902 represents the audience sizes E4+F4+G4, E2+F2+G2, E1+F1+G1 and the consistency rules 1600.

In some examples, the cross-platform correction circuitry 122 includes means for generating audience sizes. For example, the means for generating audience sizes may be implemented by metrics generator circuitry 200. In some examples, the metrics generator circuitry 200 may be instantiated by processor circuitry such as the example processor circuitry 2212 of FIG. 22. For instance, the metrics generator circuitry 200 may be instantiated by the example general purpose processor circuitry 2300 of FIG. 23 executing machine executable instructions such as that implemented by at least blocks 2002, 2004, 2006, 2008, 2010 of FIG. 20 and block 2100 of FIG. 21. In some examples, the metrics generator circuitry 200 may be instantiated by hardware logic circuitry, which may be implemented by an ASIC or the FPGA circuitry 2400 of FIG. 24 structured to perform operations corresponding to the machine readable instructions. Additionally or alternatively, the metrics generator circuitry 200 may be instantiated by any other combination of hardware, software, and/or firmware. For example, the metrics generator circuitry 200 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the cross-platform correction circuitry 122 includes means for comparing the first audience size to the second audience size. For example, the means for comparing may be implemented by comparator circuitry 202. In some examples, the comparator circuitry 202 may be instantiated by processor circuitry such as the example processor circuitry 2212 of FIG. 22. For instance, the comparator circuitry 202 may be instantiated by the example general purpose processor circuitry 2300 of FIG. 23 executing machine executable instructions such as that implemented by at least blocks 2102 and 2104 of FIG. 21. In some examples, the comparator circuitry 202 may be instantiated by hardware logic circuitry, which may be implemented by an ASIC or the FPGA circuitry 2400 of FIG. 24 structured to perform operations corresponding to the machine readable instructions. Additionally or alternatively, the comparator circuitry 202 may be instantiated by any other combination of hardware, software, and/or firmware. For example, the comparator circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the cross-platform correction circuitry 122 includes means for adjusting audience sizes (e.g., increasing and/or decreasing audience sizes). For example, the means for adjusting may be implemented by adjuster circuitry 204. In some examples, the adjuster circuitry 204 may be instantiated by processor circuitry such as the example processor circuitry 2212 of FIG. 22. For instance, the adjuster circuitry 204 may be instantiated by the example general purpose processor circuitry 2300 of FIG. 23 executing machine executable instructions such as that implemented by at least blocks 2106, 2108, and 2110 of FIG. 21. In some examples, the adjuster circuitry 204 may be instantiated by hardware logic circuitry, which may be implemented by an ASIC or the FPGA circuitry 2400 of FIG. 24 structured to perform operations corresponding to the machine readable instructions. Additionally or alternatively, the adjuster circuitry 204 may be instantiated by any other combination of hardware, software, and/or firmware. For example, the adjuster circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the cross-platform correction circuitry 122 includes means for determining a total audience sizes. For example, the means for determining may be implemented by audience determination circuitry 206. In some examples, the audience determination circuitry 206 may be instantiated by processor circuitry such as the example processor circuitry 2212 of FIG. 22. For instance, the audience determination circuitry 206 may be instantiated by the example general purpose processor circuitry 2300 of FIG. 23 executing machine executable instructions such as that implemented by at least block 2012 of FIG. 20. In some examples, the audience determination circuitry 206 may be instantiated by hardware logic circuitry, which may be implemented by an ASIC or the FPGA circuitry 2400 of FIG. 24 structured to perform operations corresponding to the machine readable instructions. Additionally or alternatively, the audience determination circuitry 206 may be instantiated by any other combination of hardware, software, and/or firmware. For example, the audience determination circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the cross-platform correction circuitry 122 of FIG. 1 is illustrated in FIG. 2, one or more of the elements, processes, and/or devices illustrated in FIG. 2 may be combined, divided, re-arranged, omitted, eliminated, and/or implemented in any other way. Further, the example metrics generator circuitry 200, the example comparator circuitry 202, the example adjuster circuitry 204, the example audience determination circuitry 206, and/or, more generally, the example cross-platform correction circuitry 122 of FIGS. 1 and 2, may be implemented by hardware alone or by hardware in combination with software and/or firmware. Thus, for example, any of the example metrics generator circuitry 200, the example comparator circuitry 202, the example adjuster circuitry 204, the example audience determination circuitry 206 and/or, more generally, the example cross-platform correction circuitry 122, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example cross-platform correction circuitry 122 of FIGS. 1 and 2 may include one or more elements, processes, and/or devices in addition to, or instead of, those illustrated in FIG. 2, and/or may include more than one of any or all of the illustrated elements, processes and devices.

Figure 20:
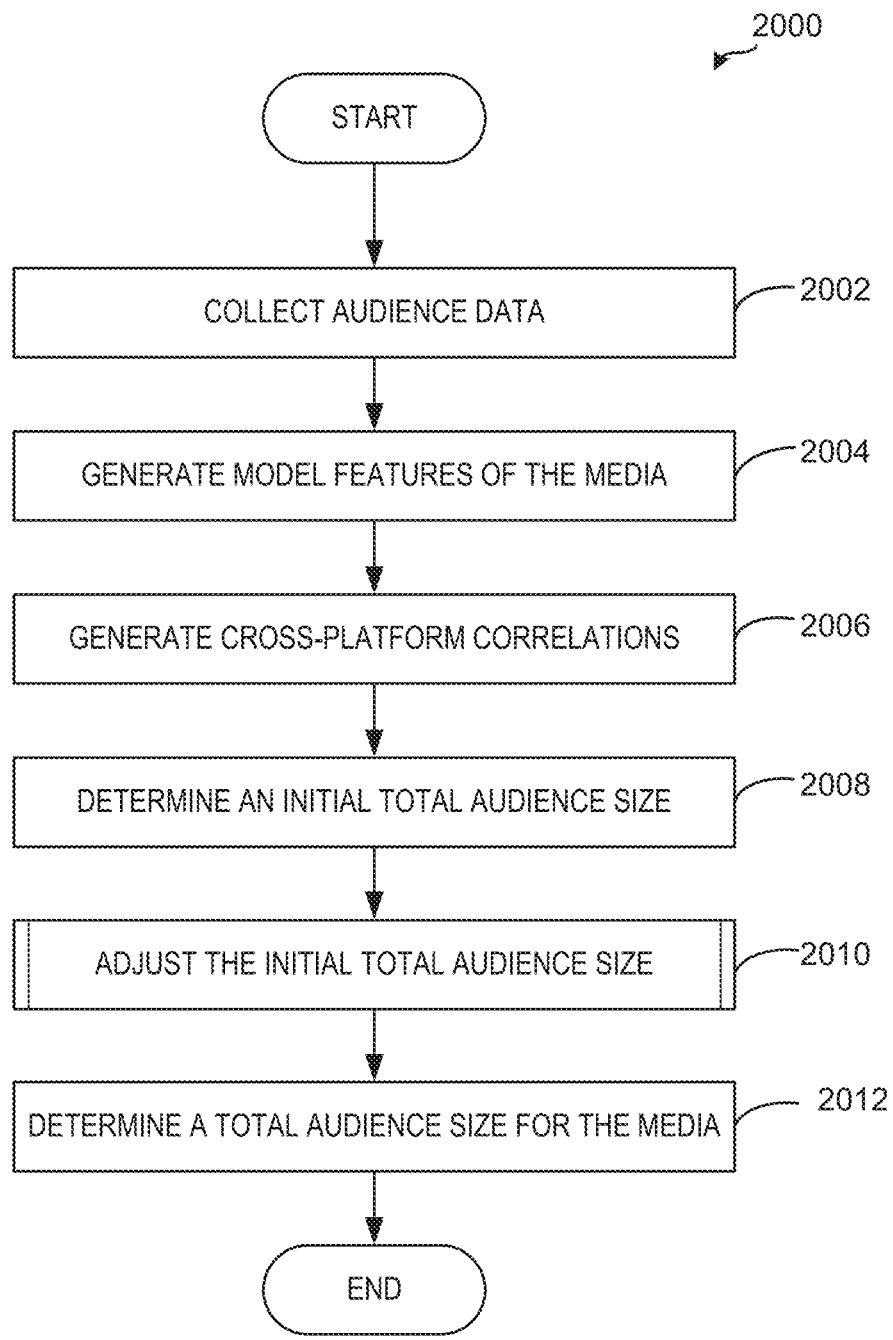
FIGS. 20 and 21 are flowcharts representative of example machine readable instructions and/or example operations that may be executed by example processor circuitry to implement the example cross-platform correction circuitry of FIGS. 1 and 2 to estimate total audience size.
Figure 21:
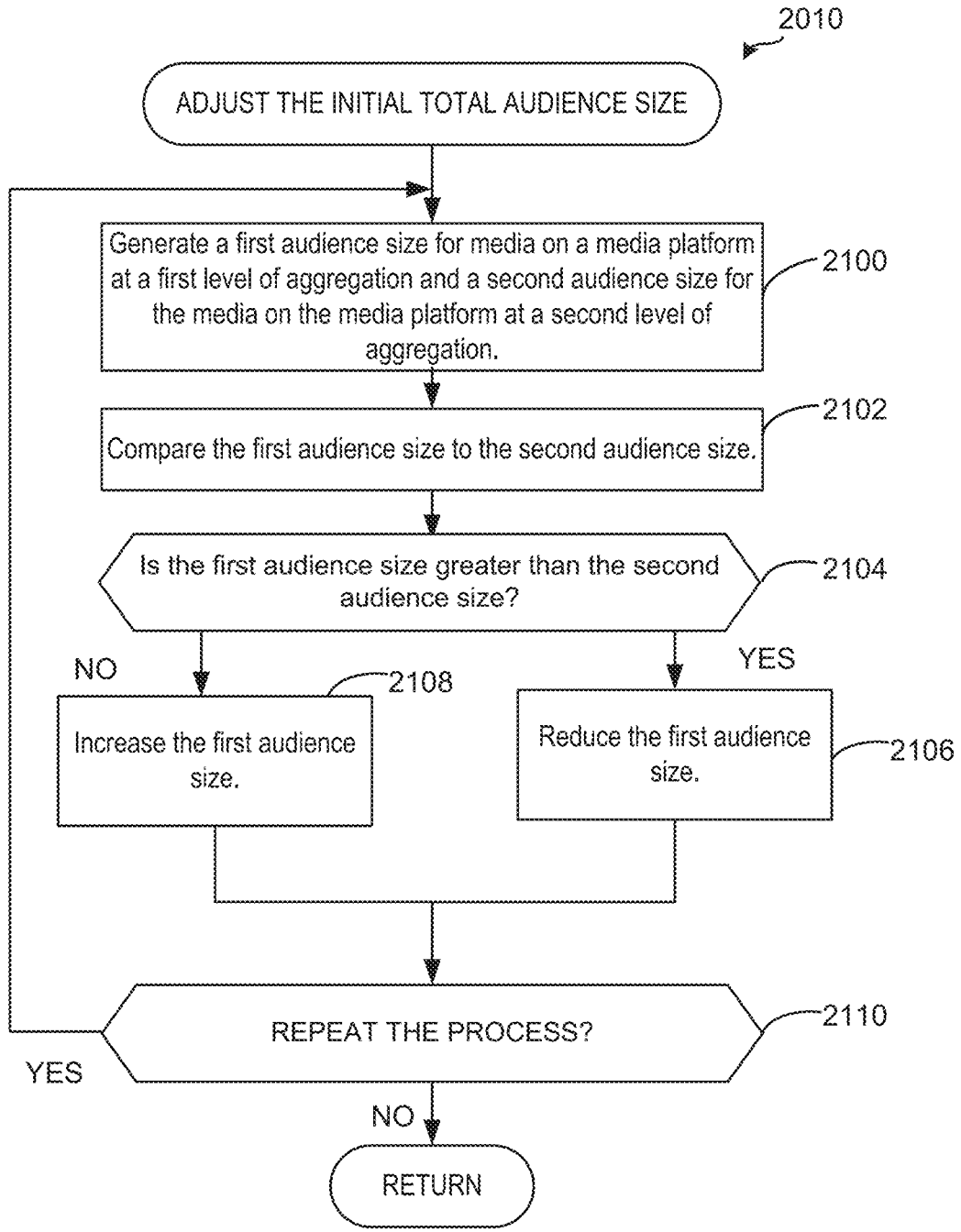

Flowcharts representative of example hardware logic circuitry, machine readable instructions, hardware implemented state machines, and/or any combination thereof for implementing the cross-platform correction circuitry 122 of FIGS. 1 and 2 are shown in FIGS. 20 and 21. The machine readable instructions may be one or more executable programs or portion(s) of one or more executable program(s) for execution by processor circuitry, such as the processor circuitry 2212 shown in the example processor platform 2200 discussed below in connection with FIG. 22 and/or the example processor circuitry discussed below in connection with FIGS. 23 and/or 24. The program(s) may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entirety of the program(s) and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) is/are described with reference to the flowcharts illustrated in FIGS. 20 and 21, many other methods of implementing the example cross-platform correction circuitry 122 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 20 and 21 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C. or (7) A with B and with C. As used herein in the context of describing structures, components, items, objects and/or things, the phrase "at least one of A and B" is intended to refer to implementations including any of (1) at least one A. (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A. (2) at least one B. or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 20 is a flowchart representative of example machine readable instructions and/or example operations 2000 that may be executed and/or instantiated by processor circuitry to determine a total audience size for a media item accessed across a plurality of platforms. The machine readable instructions and/or the operations 2000 of FIG. 20 begin at block 2002, at which the metrics generator circuitry 200 (FIG. 2) collects audience size data. In some examples, the metrics generator circuitry 200 collects audience size data for each of the platforms 910, 912, 914, 916, 918, 920, and/or 922 (FIG. 9). In some examples, the metrics generator circuitry 200 collects the campaign information 404 (FIG. 4), the demographic information 406 (FIG. 4), the TV/Desktop panel data 302 (FIG. 3), and/or the Desktop/Mobile panel data 304 (FIG. 3).

At block 2004, the example metrics generator circuitry 200 generates the model features 312 (FIG. 3). For example, the metrics generator circuitry 200 may generate the model features 312 by utilizing historical audience data 306 and/or current audience data 308. In some examples, the model features 312 are generated by gathering previously computed data regarding characteristics of the media. The model features 312 can also be generated by calculating the cross-platform correlations 310 (e.g., the example correlation calculation of equation 6 described above in conjunction with FIG. 3). Additionally or alternatively, the model features 312 can be generated by calculating randomly deduplicated audiences (e.g., the audiences of FIG. 9 calculated via example equations 7-13 described above in conjunction with FIG. 9). In some examples, the example metrics generator circuitry 200 generates the model features 312 so that the model 314 of FIGS. 3 and 5 (e.g., the TA model 126 of FIG. 1) can be trained.

At block 2006, the example metrics generator circuitry 200 generates the cross-platform correlations 310 (FIGS. 3 and 5). For example, the metrics generator circuitry 200 can generate the cross-platform correlations 310 by comparing a first platform (e.g., the desktop-only platform 714 of FIG. 7) to a second platform (e.g., the mobile-only platform 716 of FIG. 7) to determine audience members that have been exposed to media on both the first platform and the second platform (e.g., the desktop/mobile platform 718 of FIG. 7). In such examples, example cross-platform correlations 310 represents audience sizes of audience members that accessed media on two platforms such as on both the desktop and mobile platforms (e.g., desktop/mobile panel data 304) or on both the TV and desktop platforms (e.g., TV/desktop panel data 302).

At block 2008, the example metrics generator circuitry 200 determines an initial total audience size. For example, the metrics generator circuitry 200 can determine the initial total audience size (e.g., the initial TA 522 of FIG. 5) by serving the model 126 on the model features 312. For example, the metrics generator circuitry 200 determines the initial total audience size by pushing the model features 312 through decision trees that form the model 126 so that the prediction output generated by the model 126 is the TA 522.

At block 2010, the example adjuster circuitry 204 (FIG. 2) adjusts the initial total audience size. For example, the adjuster circuitry 204 adjusts the initial total audience size as described below in conjunction with FIG. 21.

At block 2012, the example audience determination circuitry 206 (FIG. 2) determines a total audience size for the media across multiple platforms (e.g., two or more of the platforms 910, 912, 914, 916, 918, 920, and/or 922). For example, the example audience determination circuitry 206 utilizes the adjusted audience size generated at block 2010 by the adjuster circuitry 204 to determine the total audience size for the media. In the example of FIG. 20, the audience determination circuitry 206 determines the total audience size for the media across multiple platforms by setting the total audience size equal to the adjusted audience size. The example instructions or operations of FIG. 20 ends.

FIG. 21 is a flowchart representative of example machine readable instructions and/or example operations that may be executed and/or instantiated by processor circuitry to implement the cross-platform correction circuitry 122 (FIGS. 1 and 2). The example instructions or operations of FIG. 21 can be used to implement block 2010 of FIG. 20. The machine readable instructions and/or operations of FIG. 21 begin at block 2100, at which the example metrics generator circuitry 200 (FIG. 2) generates a first audience size (e.g., A2 of FIG. 10) for a media item on a media platform (e.g., TV-only 910 of FIG. 9) at a first level of aggregation (e.g., site/mult networks 906) and a second audience size (e.g., A4 of FIG. 10) for the media item on the media platform (e.g., TV-only 910 of FIG. 9) at a second level of aggregation (e.g., site/network 902). For example, the metrics generator circuitry 200 generates the first audience size by determining an audience size A2 for the number of people that accessed the media on a single website and provided by multiple TV networks and generates the second audience size by determining an audience size A4 for the number of people that accessed the media on a single website and provided by a single TV network. In some examples, the first audience size and/or the second audience size includes a summation of the audience sizes (e.g., E2+F2+G2, E3+F3+G3, etc. of FIGS. 10, 11, 12, 13). In some examples, the first level of aggregation represents an aggregation of audience sizes that accessed the media item on a first TV network (a first TV network audience size) and on a first website (a first website audience size) exclusive of a second website (e.g., site/network 902). In some examples, the second level of aggregation represents an aggregation of audience sizes that accessed the media item on the first TV network (a first TV network audience size) and on the first website (a first website audience size) and the second website (a second website audience size) (e.g., mult sites/network 904). In some examples, the first level of aggregation and/or the second level of aggregation represents an aggregation of audience sizes that accessed the media item on the first TV network (a first TV network audience size) and a second TV network (a second TV network audience size) and on the first website (a first website audience size) exclusive of the second website (e.g., site/mult networks 906). In some examples, the first level of aggregation and/or the second level of aggregation represents aggregated audience sizes that accessed media on the first TV network (a first TV network audience size) and second TV network (a second TV network audience size) and on the first website (a first website audience size) and the second website (a second website audience size) (e.g., mult sites/mult networks 908).

At block 2102, the example comparator circuitry 202 (FIG. 2) compares the first audience size to the second audience size. In the example comparison 1000 of FIG. 10, the example comparator circuitry 202 compares the audience size A4 to the audience A2. Additionally or alternatively, in the example comparison 1000, the comparator circuitry 202 compares the audience size B4+C4+D4 to the audience size B2+C2+D2. In some examples, the comparator circuitry 202 can perform any one or more of the comparisons 1000, 1100 (FIG. 11). 1200 (FIG. 12), and/or 1300 (FIG. 13).

At block 2104, the comparator circuitry 202 determines whether the first audience size is greater than the second audience size. If the first audience size is greater than the second audience size (block 2104), control advances to block 2106. Alternatively, if the first audience size is less than the second audience size (block 2104), control advances to block 2108.

At block 2106, the example adjuster circuitry 204 (FIG. 2) adjusts the first audience size by reducing the first audience size based on the second audience size. For example the adjuster circuitry 204 can reduce the audience size A4 based on the audience size A1 by setting the audience size A4 to be equal to or less than the audience size A1 if the audience size A4 is greater than the audience size A1. For example, consistency rules such as the consistency rules 1400 (FIG. 14) can require the audience size A4 to be less than or equal to A1. The example dataset 1700 (FIG. 17) includes data for the example audience size A4 (e.g., an audience size of the ABC network to be 20,000 people) and for the example audience size A1 (e.g., an audience size of the CBS network and the ABC network to be 15,000 people). According to the consistency rules 1400, the audience size A4 needs to be less than or equal to the audience size A1. Thus, the example dataset 1700 reporting A4=20000 and A1=15000 is inconsistent with the consistency rules 1400. As such, the example adjuster circuitry 204 can reduce the audience size A4 (e.g., 20000) to be equal to the audience size A1 (e.g., 15000). Alternatively, the adjuster circuitry 204 can reduce the audience size A4 to be less than the audience size A1 (e.g., A4 can be reduced to be less than 15000). In some examples, the adjuster circuitry 204 reduces the first audience size based on one or more of the consistency rules 1400 (FIG. 14), 1500 (FIG. 15), and/or 1600 (FIG. 16).

At block 2108, the example adjuster circuitry 204 adjusts the first audience size by increasing the first audience size based on the second audience size. For example, the adjuster circuitry 204 can increase the audience size A3 based on the audience size A4 by setting the audience size A3 to be equal to or greater than the audience size A4 if the audience size A3 is less than A4. For example, consistency rules such as the consistency rules 1400 (FIG. 14) require the audience size A4 to be greater than or equal to the audience size A3. The example dataset 1700 (FIG. 17) includes data for the example audience size A4 (e.g., an audience size of the ABC TV network accessed on the Instagram website to be 6,000 people) and for the example audience size A3 (e.g., an audience size of the CBS TV network and the ABC TV network to be 10,000 people). According to the consistency rules 1400, the audience size A4 needs to be greater than or equal to the audience size A3. Thus, the example dataset 1700 reporting A4=6000 and A3=100000 is inconsistent with the consistency rules 1400. As such, the example adjuster circuitry 204 can increase the audience size A4 (e.g., 6000) to be equal to the audience size A3 (e.g., 10000). Alternatively, the adjuster circuitry 204 can increase the audience size A4 to be greater than the audience size A3 (e.g., A4 can be increased to be greater than 10000). In some examples, the adjuster circuitry 204 increases the first audience size based on one or more of the consistency rules 1400 (FIG. 14), 1500 (FIG. 15), and/or 1600 (FIG. 16).

At block 2110, the adjuster circuitry 204 determines whether to repeat the process. For example, the instructions of FIG. 21 can be repeated if the adjuster circuitry 204 determines that additional audience sizes need to be adjusted according to the consistency rules 1400, 1500, 1600. If the example adjuster circuitry 204 determines that the instructions of FIG. 21 should be repeated, control returns to block 2100. Otherwise, the example instructions or operations of FIG. 21 end, and control returns to, for example, the instructions or operations of FIG. 20.

Figure 22:
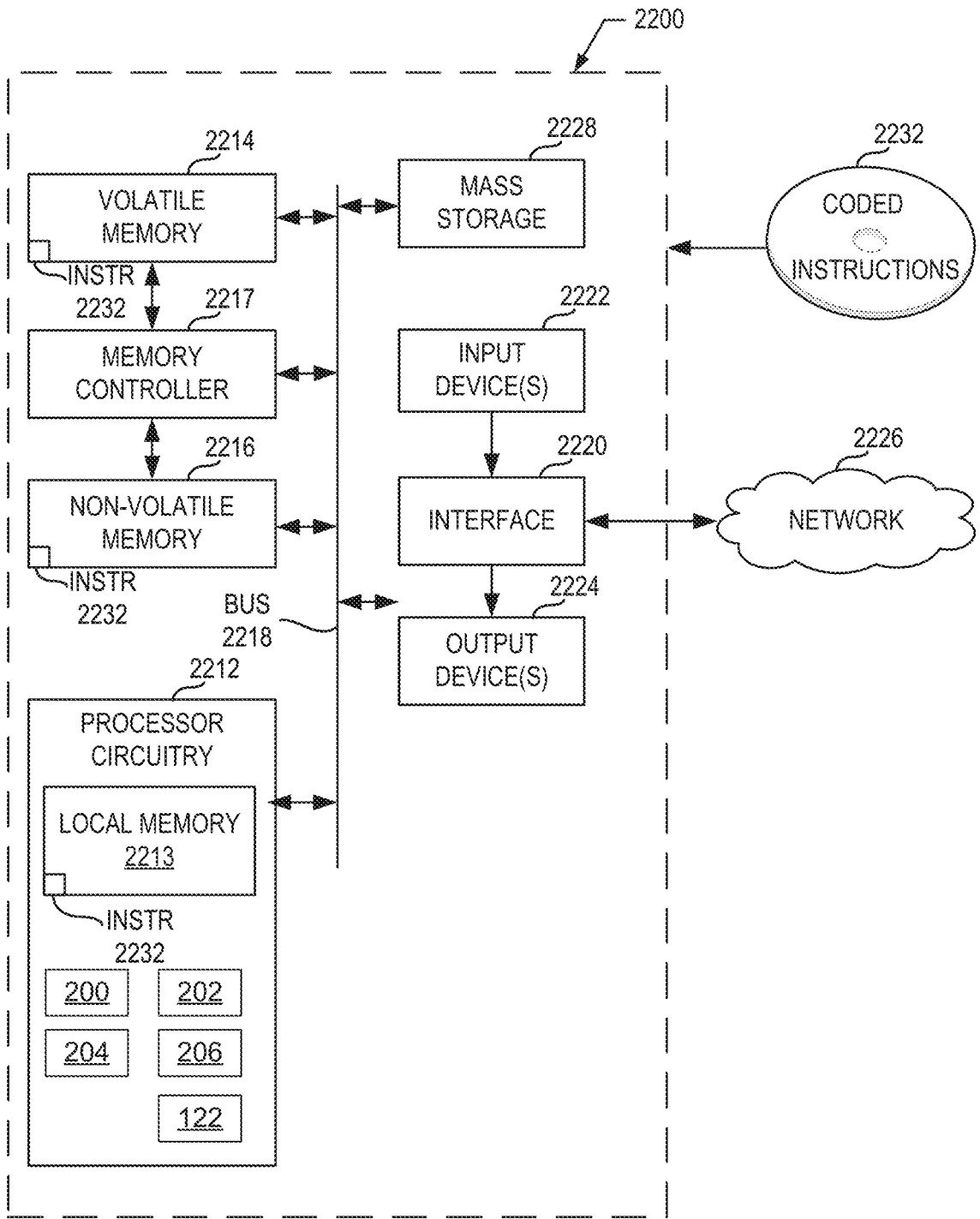
FIG. 22 is a block diagram of an example processing platform including processor circuitry structured to execute the example machine readable instructions and/or the example operations of FIGS. 20 and 21 to implement the example cross-platform correction circuitry of FIG. 2.

FIG. 22 is a block diagram of an example processor platform 2200 structured to execute and/or instantiate the machine readable instructions and/or the operations of FIGS. 20 and 21 to implement the cross-platform correction circuitry 122 of FIG. 2. The processor platform 2200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other suitable type of computing device.

The processor platform 2200 of the illustrated example includes processor circuitry 2212. The processor circuitry 212 of the illustrated example is hardware. For example, the processor circuitry 2212 can be implemented by one or more integrated circuits, logic circuits, FPGAs, microprocessors, CPUs, GPUs, DSPs, and/or microcontrollers from any desired family or manufacturer. The processor circuitry 2212 may be implemented by one or more semiconductor based (e.g., silicon based) devices. In this example, the processor circuitry 412 implements the metrics generator circuitry 200, the comparator circuitry 202, the adjuster circuitry 204, the audience determination circuitry 206, and/or more generally the cross-platform correction circuitry 122 of FIG. 2.

The processor circuitry 2212 of the illustrated example includes a local memory 2213 (e.g., a cache, registers, etc.). The processor circuitry 2212 of the illustrated example is in communication with a main memory including a volatile memory 2214 and a non-volatile memory 2216 by a bus 2218. The volatile memory 2214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2216 may be implemented by flash memory and/or any other desired type of memory device. Access to the main memory 2214, 2216 of the illustrated example is controlled by a memory controller 2217.

The processor platform 2200 of the illustrated example also includes interface circuitry 2220. The interface circuitry 2220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 2222 are connected to the interface circuitry 2220. The input device(s) 2222 permit(s) a user to enter data and/or commands into the processor circuitry 2212.

One or more output devices 2224 are also connected to the interface circuitry 2220 of the illustrated example. The interface circuitry 2220 of the illustrated example, thus, typically includes a graphics driver card, a graphics driver chip, and/or graphics processor circuitry such as a GPU.

The interface circuitry 2220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 2200 of the illustrated example also includes one or more mass storage devices 2228 to store software and/or data. Examples of such mass storage devices 2228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 2232, which may be implemented by the machine readable instructions of FIGS. 20 and 21, may be stored in the mass storage device 2228, in the volatile memory 2214, in the non-volatile memory 2216, and/or on a removable non-transitory computer readable storage medium such as a CD or DVD.

Figure 23:
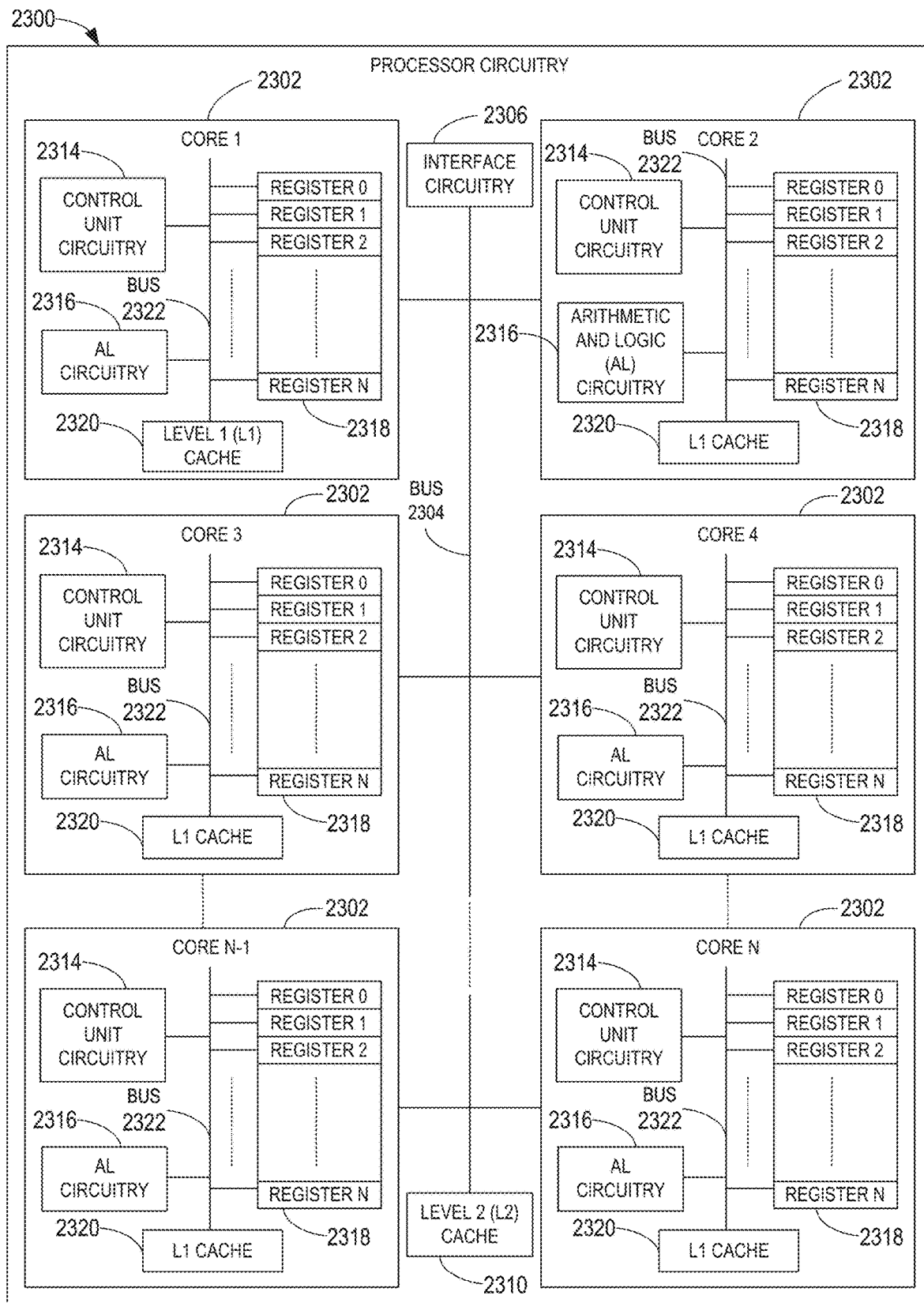
FIG. 23 is a block diagram of an example implementation of the processor circuitry of FIG. 22.

FIG. 23 is a block diagram of an example implementation of the processor circuitry 2212 of FIG. 22. In this example, the processor circuitry 2212 of FIG. 22 is implemented by a general purpose microprocessor 2300. The general purpose microprocessor circuitry 2300 executes some or all of the machine readable instructions of the flowcharts of FIGS. 20 and 21 to effectively instantiate the circuitry of FIG. 2 as logic circuits to perform the operations corresponding to those machine readable instructions. In some such examples, the circuitry of FIG. 2 is instantiated by the hardware circuits of the microprocessor 2300 in combination with the instructions. For example, the microprocessor 2300 may implement multi-core hardware circuitry such as a CPU, a DSP, a GPU, an XPU, etc. Although it may include any number of example cores 2302 (e.g., 1 core), the microprocessor 2300 of this example is a multi-core semiconductor device including N cores. The cores 2302 of the microprocessor 2300 may operate independently or may cooperate to execute machine readable instructions. For example, machine code corresponding to a firmware program, an embedded software program, or a software program may be executed by one of the cores 2302 or may be executed by multiple ones of the cores 2302 at the same or different times. In some examples, the machine code corresponding to the firmware program, the embedded software program, or the software program is split into threads and executed in parallel by two or more of the cores 2302. The software program may correspond to a portion or all of the machine readable instructions and/or operations represented by the flowcharts of FIGS. 20 and 21.

The cores 2302 may communicate by a first example bus 2304. In some examples, the first bus 2304 may implement a communication bus to effectuate communication associated with one(s) of the cores 2302. For example, the first bus 2304 may implement at least one of an Inter-Integrated Circuit (I2C) bus, a Serial Peripheral Interface (SPI) bus, a PCI bus, or a PCIe bus. Additionally or alternatively, the first bus 2304 may implement any other type of computing or electrical bus. The cores 2302 may obtain data, instructions, and/or signals from one or more external devices by example interface circuitry 2306. The cores 2302 may output data, instructions, and/or signals to the one or more external devices by the interface circuitry 2306. Although the cores 2302 of this example include example local memory 2320 (e.g., Level 1 (L1) cache that may be split into an L1 data cache and an L1 instruction cache), the microprocessor 2300 also includes example shared memory 2310 that may be shared by the cores (e.g., Level 2 (L2_cache)) for high-speed access to data and/or instructions. Data and/or instructions may be transferred (e.g., shared) by writing to and/or reading from the shared memory 2310. The local memory 2320 of each of the cores 2302 and the shared memory 2310 may be part of a hierarchy of storage devices including multiple levels of cache memory and the main memory (e.g., the main memory 2214, 2216 of FIG. 22). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2302 may be referred to as a CPU, DSP, GPU, etc., or any other type of hardware circuitry. Each core 2302 includes control unit circuitry 2314, arithmetic and logic (AL) circuitry (sometimes referred to as an ALU) 2316, a plurality of registers 2318, the L1 cache 2320, and a second example bus 2322. Other structures may be present. For example, each core 2302 may include vector unit circuitry, single instruction multiple data (SIMD) unit circuitry, load/store unit (LSU) circuitry, branch/jump unit circuitry, floating-point unit (FPU) circuitry, etc. The control unit circuitry 2314 includes semiconductor-based circuits structured to control (e.g., coordinate) data movement within the corresponding core 2302. The AL circuitry 2316 includes semiconductor-based circuits structured to perform one or more mathematic and/or logic operations on the data within the corresponding core 2302. The AL circuitry 2316 of some examples performs integer based operations. In other examples, the AL circuitry 2316 also performs floating point operations. In yet other examples, the AL circuitry 2316 may include first AL circuitry that performs integer based operations and second AL circuitry that performs floating point operations. In some examples, the AL circuitry 2316 may be referred to as an Arithmetic Logic Unit (ALU). The registers 2318 are semiconductor-based structures to store data and/or instructions such as results of one or more of the operations performed by the AL circuitry 2316 of the corresponding core 2302. For example, the registers 2318 may include vector register(s), SIMD register(s), general purpose register(s), flag register(s), segment register(s), machine specific register(s), instruction pointer register(s), control register(s), debug register(s), memory management register(s), machine check register(s), etc. The registers 2318 may be arranged in a bank as shown in FIG. 23. Alternatively, the registers 2318 may be organized in any other arrangement, format, or structure including distributed throughout the core 2302 to shorten access time. The second bus 2322 may implement at least one of an I2C bus, a SPI bus, a PCI bus, or a PCIe bus Each core 2302 and/or, more generally, the microprocessor 2300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 24:
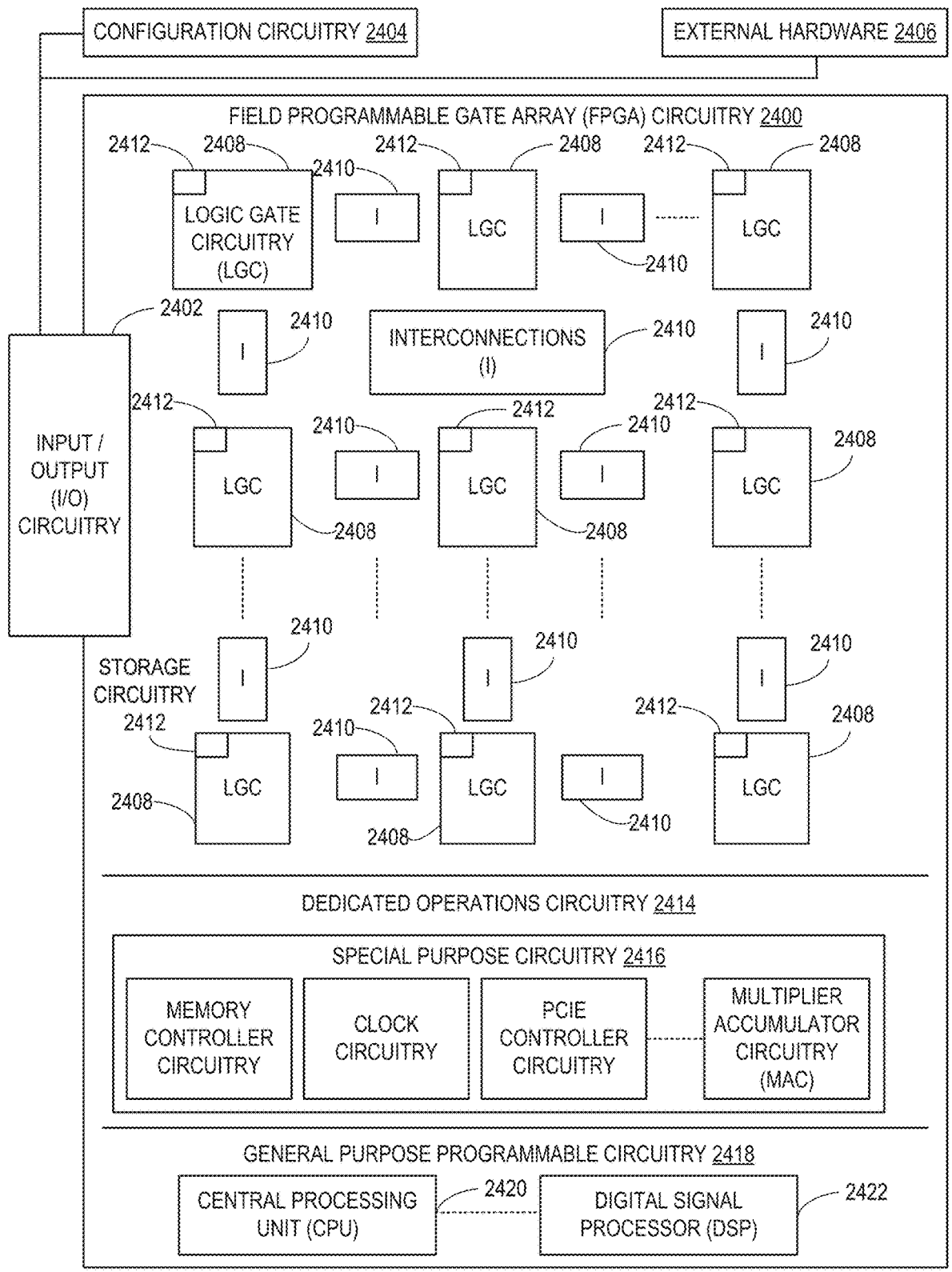
FIG. 24 is a block diagram of another example implementation of the processor circuitry of FIG. 22.

FIG. 24 is a block diagram of another example implementation of the processor circuitry 2212 of FIG. 22. In this example, the processor circuitry 2212 is implemented by FPGA circuitry 2400. The FPGA circuitry 2400 can be used, for example, to perform operations that could otherwise be performed by the example microprocessor 2300 of FIG. 23 executing corresponding machine readable instructions. However, once configured, the FPGA circuitry 2400 instantiates the machine readable instructions in hardware and, thus, can often execute the operations faster than they could be performed by a general purpose microprocessor executing the corresponding software.

More specifically, in contrast to the microprocessor 2300 of FIG. 23 described above (which is a general purpose device that may be programmed to execute some or all of the machine readable instructions represented by the flowcharts of FIGS. 20 and 21 but whose interconnections and logic circuitry are fixed once fabricated), the FPGA circuitry 2400 of the example of FIG. 24 includes interconnections and logic circuitry that may be configured and/or interconnected in different ways after fabrication to instantiate, for example, some or all of the machine readable instructions represented by the flowcharts of FIGS. 20 and 21. In particular, the FPGA 2400 may be thought of as an array of logic gates, interconnections, and switches. The switches can be programmed to change how the logic gates are interconnected by the interconnections, effectively forming one or more dedicated logic circuits (unless and until the FPGA circuitry 2400 is reprogrammed). The configured logic circuits enable the logic gates to cooperate in different ways to perform different operations on data received by input circuitry. Those operations may correspond to some or all of the software represented by the flowcharts of FIGS. 20 and 21. As such, the FPGA circuitry 2400 may be structured to effectively instantiate some or all of the machine readable instructions of the flowcharts of FIGS. 20 and 21 as dedicated logic circuits to perform the operations corresponding to those software instructions in a dedicated manner analogous to an ASIC. Therefore, the FPGA circuitry 2400 may perform the operations corresponding to the some or all of the machine readable instructions of FIG. 24 faster than the general purpose microprocessor can execute the same.

In the example of FIG. 24, the FPGA circuitry 2400 is structured to be programmed (and/or reprogrammed one or more times) by an end user by a hardware description language (HDL) such as Verilog. The FPGA circuitry 2400 of FIG. 24, includes example input/output (I/O) circuitry 2402 to obtain and/or output data to/from example configuration circuitry 2404 and/or external hardware (e.g., external hardware circuitry) 2406. For example, the configuration circuitry 2404 may implement interface circuitry that may obtain machine readable instructions to configure the FPGA circuitry 2400, or portion(s) thereof. In some such examples, the configuration circuitry 2404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2406 may implement the microprocessor 2300 of FIG. 23. The FPGA circuitry 2400 also includes an array of example logic gate circuitry 2408, a plurality of example configurable interconnections 2410, and example storage circuitry 2412. The logic gate circuitry 2408 and interconnections 2410 are configurable to instantiate one or more operations that may correspond to at least some of the machine readable instructions of FIGS. 20 and 21 and/or other desired operations. The logic gate circuitry 2408 shown in FIG. 24 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2408 to enable configuration of the electrical structures and/or the logic gates to form circuits to perform desired operations. The logic gate circuitry 2408 may include other electrical structures such as look-up tables (LUTs), registers (e.g., flip-flops or latches), multiplexers, etc.

The interconnections 2410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2408 to program desired logic circuits.

The storage circuitry 2412 of the illustrated example is structured to store result(s) of the one or more of the operations performed by corresponding logic gates. The storage circuitry 2412 may be implemented by registers or the like. In the illustrated example, the storage circuitry 2412 is distributed amongst the logic gate circuitry 2408 to facilitate access and increase execution speed.

The example FPGA circuitry 2400 of FIG. 24 also includes example Dedicated Operations Circuitry 2414. In this example, the Dedicated Operations Circuitry 2414 includes special purpose circuitry 2416 that may be invoked to implement commonly used functions to avoid the need to program those functions in the field. Examples of such special purpose circuitry 2416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2400 may also include example general purpose programmable circuitry 2418 such as an example CPU 2420 and/or an example DSP 2422. Other general purpose programmable circuitry 2418 may additionally or alternatively be present such as a GPU, an XPU, etc., that can be programmed to perform other operations.

Although FIGS. 23 and 24 illustrate two example implementations of the processor circuitry 2212 of FIG. 22, many other approaches are contemplated. For example, as mentioned above, modern FPGA circuitry may include an on-board CPU, such as one or more of the example CPU 2420 of FIG. 24. Therefore, the processor circuitry 2212 of FIG. 22 may additionally be implemented by combining the example microprocessor 2300 of FIG. 23 and the example FPGA circuitry 2400 of FIG. 24. In some such hybrid examples, a first portion of the machine readable instructions represented by the flowcharts of FIGS. 20 and 21 may be executed by one or more of the cores 2302 of FIG. 23, a second portion of the machine readable instructions represented by the flowcharts of FIGS. 20 and 21 may be executed by the FPGA circuitry 2400 of FIG. 24, and/or a third portion of the machine readable instructions represented by the flowcharts of FIGS. 20 and 21 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 2212 of FIG. 22 may be in one or more packages. For example, the processor circuitry 2300 of FIG. 23 and/or the FPGA circuitry 2400 of FIG. 24 may be in one or more packages. In some examples, an XPU may be implemented by the processor circuitry 2212 of FIG. 22, which may be in one or more packages. For example, the XPU may include a CPU in one package, a DSP in another package, a GPU in yet another package, and an FPGA in still yet another package.

Figure 25:
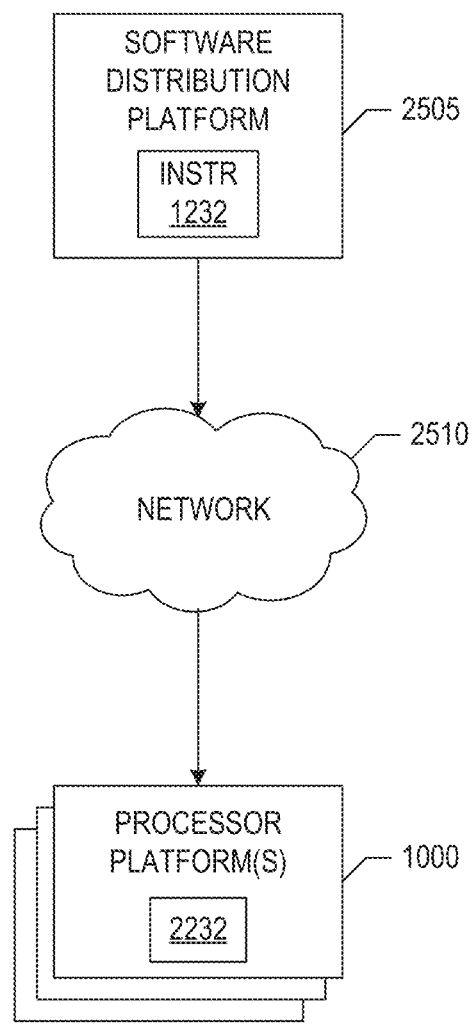
FIG. 25 is a block diagram of an example software distribution platform (e.g., one or more servers) to distribute software (e.g., software corresponding to the example machine readable instructions of FIGS. 20 and 21) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2505 to distribute software such as the example machine readable instructions 2232 of FIG. 22 to hardware devices owned and/or operated by third parties is illustrated in FIG. 25. The example software distribution platform 2505 may be implemented by any computer server, data facility, cloud service, etc., capable of storing and transmitting software to other computing devices. The third parties may be customers of the entity owning and/or operating the software distribution platform 2505. For example, the entity that owns and/or operates the software distribution platform 2505 may be a developer, a seller, and/or a licensor of software such as the example machine readable instructions 2232 of FIG. 22. The third parties may be consumers, users, retailers, OEMs, etc., who purchase and/or license the software for use and/or re-sale and/or sub-licensing. In the illustrated example, the software distribution platform 2505 includes one or more servers and one or more storage devices. The storage devices store the machine readable instructions 2232, which may correspond to the example machine readable instructions 2000 and/or 2100 of FIGS. 20 and/or 21, as described above. The one or more servers of the example software distribution platform 2505 are in communication with a network 1510, which may correspond to any one or more of the Internet and/or any of the example networks 2510 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 2232 from the software distribution platform 2505. For example, the software, which may correspond to the example machine readable instructions 2000 and/or 2100 of FIGS. 20 and 21, may be downloaded to the example processor platform 2200, which is to execute the machine readable instructions 2232 to implement the flowcharts of FIGS. 20 and 21. In some examples, one or more servers of the software distribution platform 2505 periodically offer, transmit, and/or force updates to the software (e.g., the example machine readable instructions 2232 of FIG. 22) to ensure improvements, patches, updates, etc., are distributed and applied to the software at the end user devices.

From the foregoing, it will be appreciated that example systems, methods, apparatus, and articles of manufacture have been disclosed that determine total audience ratings for TV, walled garden, and/or rest-of-web. Examples disclosed herein may be used to deduplicate total audience ratings. Disclosed systems, methods, apparatus, and articles of manufacture improve a computing device by correcting and/or adjusted total audience estimates across media platforms. In particular, the computing device is improved to operate more accurately by generating more accurate total audience sizes for media platforms.

Example 1 includes an apparatus to determine a total audience size, the apparatus comprising interface circuitry, and processor circuitry including one or more of at least one of a central processor unit, a graphic processor unit, or a digital signal processor, the at least one of the central processor unit, the graphic processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate metrics generator circuitry to generate a first audience size for media accessed by first devices of a first media platform at a first level of aggregation, the first level of aggregation corresponding to the media accessed on a first television network and accessed on a first website exclusive of a second website, generate a second audience size for the media accessed by the first devices of the first media platform at a second level of aggregation, the second level of aggregation corresponding to the media accessed on the first television network and accessed on the first website and the second website, comparator circuitry to compare the first audience size to the second audience size, adjustor circuitry to reduce the first audience size based on the second audience size in response to the first audience size being greater than the second audience size, and audience determination circuitry to determine a total audience size for the media accessed by devices of the first media platform based on the first audience size and the second audience size.

Example 2 includes the apparatus of example 1, wherein at least one of the first level of aggregation or the second level of aggregation corresponds to the media accessed on the first television network and a second television network and accessed on the first website exclusive of the second website.

Example 3 includes the apparatus of example 1, wherein at least one of the first level of aggregation or the second level of aggregation corresponds to the media accessed on the first television network and a second television network and accessed on the first website and the second website.

Example 4 includes the apparatus of example 1, wherein the metrics generator circuitry is to generate the first audience size as a summation of first audience members that accessed the media via the first devices of the first media platform and second audience members that accessed the media via second devices of a second media platform the metrics generator circuitry to generate the second audience size as a summation of third audience members that accessed the media via the first devices of the first platform and fourth audience members that accessed the media via the second devices of the second platform.

Example 5 includes the apparatus of example 1, wherein the first media platform is at least one of a television platform, a desktop platform, or a mobile platform.

Example 6 includes the apparatus of example 1, wherein the adjustor circuitry is to increase the first audience size based on the second audience size in response to the first audience size being less than the second audience size.

Example 7 includes a method to determine a total audience size, the method comprising generating, by executing an instruction with processor circuitry, a first audience size for media accessed by first devices of a first media platform at a first level of aggregation, the first level of aggregation corresponding to the media accessed on a first television network and accessed on a first website exclusive of a second website, generating, by executing an instruction with the processor circuitry, a second audience size for the media accessed by the first devices of the first media platform at a second level of aggregation, the second level of aggregation corresponding to the media accessed on the first television network and accessed on the first website and the second website, comparing, by executing an instruction with the processor circuitry, the first audience size to the second audience size, reducing, by executing an instruction with the processor circuitry, the first audience size based on the second audience size in response to the first audience size being greater than the second audience size, and determining, by executing an instruction with the processor circuitry, a total audience size for the media accessed by devices of the first platform based on the first audience size and the second audience size.

Example 8 includes the method of example 7, wherein at least one of the first level of aggregation or the second level of aggregation corresponds to the media accessed on the first television network and a second television network and accessed on the first website exclusive of the second website.

Example 9 includes the method of example 7, wherein at least one of the first level of aggregation or the second level of aggregation corresponds to the media accessed on the first television network and a second television network and accessed on the first website and the second website.

Example 10 includes the method of example 7, wherein the first audience size is a summation of first audience members that accessed the media via the first devices of the first media platform and second audience members that accessed the media via second devices of a second media platform, and wherein the second audience size is a summation of third audience members that accessed the media via the first devices of the first media platform and fourth audience members that accessed the media via the second devices of the second media platform.

Example 11 includes the method of example 7, wherein the first media platform is at least one of a television platform, a desktop platform, or a mobile platform.

Example 12 includes the method of example 7, further including increasing the first audience size based on the second audience size in response to the first audience size being less than the second audience size.

Example 13 includes At least one non-transitory computer readable storage medium comprising instruction that, when executed, cause processor circuitry to at least generate a first audience size for media accessed by first devices of a first media platform at a first level of aggregation, the first level of aggregation corresponding to the media accessed on a first television network and accessed on a first website exclusive of a second website, generate a second audience size for the media accessed by the first devices of the first media platform at a second level of aggregation, the second level of aggregation corresponding to the media accessed on the first television network and accessed on the first website and the second website, compare the first audience size to the second audience size, reduce the first audience size based on the second audience size in response to the first audience size being greater than the second audience size, and determine a total audience size for the media accessed by devices of the first media platform based on the first audience size and the second audience size.

Example 14 includes the at least one non-transitory computer readable storage medium of example 13, wherein at least one of the first level of aggregation or the second level of aggregation corresponds to the media accessed on the first television network and a second television network and accessed on the first website exclusive of the second website.

Example 15 includes the at least one non-transitory computer readable storage medium of example 13, wherein at least one of the first level of aggregation or the second level of aggregation corresponds to the media accessed on the first television network and a second television network and accessed on the first website and the second website.

Example 16 includes the at least one non-transitory computer readable storage medium of example 13, wherein the first audience size is a summation of first audience members that accessed the media via the first devices of the first media platform and second audience members that accessed the media via second devices of a second media platform, and wherein the second audience size is a summation of third audience members that accessed the media via the first devices of the first media platform and fourth audience members that accessed the media via the second devices of the second media platform.

Example 17 includes the at least one non-transitory computer readable storage medium of example 13, wherein the first media platform is at least one of a television platform, a desktop platform, or a mobile platform.

Example 18 includes the at least one non-transitory computer readable storage medium of example 13, wherein the instructions, when executed, cause the processor circuitry to increase the first audience size based on the second audience size in response to the first audience size being less than the second audience size.

Example 19 includes an apparatus comprising at least one memory, instructions, and processor circuitry to execute the instructions to generate a first audience size for media accessed by first devices of a first media platform at a first level of aggregation, the first level of aggregation corresponding to the media accessed on a first television network and accessed on a first website exclusive of a second website, generate a second audience size for the media accessed by the first devices of the first media platform at a second level of aggregation, the second level of aggregation corresponding to the media accessed on the first television network and accessed on the first website and the second website, compare the first audience size to the second audience size, reduce the first audience size based on the second audience size in response to the first audience size being greater than the second audience size, and determine a total audience size for the media accessed by devices of the first media platform based on the first audience size and the second audience size.

Example 20 includes the apparatus of example 19, wherein at least one of the first level of aggregation or the second level of aggregation corresponds to the media accessed on the first television network and a second television network and accessed on the first website exclusive of the second website.

Example 21 includes the apparatus of example 19, wherein at least one of the first level of aggregation or the second level of aggregation corresponds to the media accessed on the first television network and a second television network and accessed on the first website and the second website.

Example 22 includes the apparatus of example 19, wherein the first audience size is a summation of first audience members that accessed the media via the first devices of the first media platform and second audience members that accessed the media via second devices of a second media platform, and wherein the second audience size is a summation of third audience members that accessed the media via the first devices of the first media platform and fourth audience members that accessed the media via the second devices of the second media platform.

Example 23 includes the apparatus of example 19, wherein the first media platform is at least one of a television platform, a desktop platform, or a mobile platform.

Example 24 includes the apparatus of example 19, wherein the processor circuitry is to execute the instructions to increase the first audience size based on the second audience size in response to the first audience size being less than the second audience size.

Example 25 includes an apparatus to determine a total audience size comprising means for generating to generate a first audience size for media accessed by first devices of a first media platform at a first level of aggregation, the first level of aggregation corresponding to the media accessed on a first media television network and accessed on a first website exclusive of a second website, generate a second audience size for the media accessed by the first devices of the first media platform at a second level of aggregation, the second level of aggregation corresponding to the media accessed on the first media television network and accessed on the first website and the second website, means for comparing to compare the first audience size to the second audience size, means for adjusting to reduce the first audience size based on the second audience size in response to the first audience size being greater than the second audience size, and means for determining a total audience size for the media on accessed by the first devices of the first media platform based on the first audience size and the second audience size.

Example 26 includes the apparatus of example 25, wherein at least one of the first level of aggregation or the second level of aggregation corresponds to the media accessed on the first television network and a second television network and accessed on the first website exclusive of the second website.

Example 27 includes the apparatus of example 25, wherein at least one of the first level of aggregation or the second level of aggregation corresponds to the media accessed on the first television network and a second television network and accessed on the first website and the second website.

Example 28 includes the apparatus of example 25, wherein the first audience size is a summation of first audience members that accessed the media via the first devices of the first media platform and second audience members that accessed the media via second devices of a second media platform, and wherein the second audience size is a summation of third audience members that accessed the media via the first devices of the first media platform and fourth audience members that accessed the media via the second devices of the second media platform.

Example 29 includes the apparatus of example 25, wherein the first media platform is at least one of a television platform, a desktop platform, or a mobile platform.

Example 30 includes the apparatus of example 25, wherein the means for adjusting is to increase the first audience size based on the second audience size in response to the first audience size being less than the second audience size.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to determine a total audience size, the apparatus comprising:
   interface circuitry; and
   processor circuitry including one or more of:
   at least one of a central processor unit, a graphic processor unit, or a digital signal processor, the at least one of the central processor unit, the graphic processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus;
   a Field Programmable Gate Array (FPGA), the FPGA including first logic gate circuitry, a plurality of configurable interconnections, and storage circuitry, the first logic gate circuitry and interconnections to perform one or more second operations, the storage circuitry to store a result of the one or more second operations; or
   Application Specific Integrate Circuitry (ASIC) including second logic gate circuitry to perform one or more third operations;
   the processor circuitry to perform at least one of the first operations, the second operations, or the third operations to instantiate:
   metrics generator circuitry to:
   generate a first audience size for media accessed by first devices of a first media platform at a first level of aggregation, the first level of aggregation corresponding to the media accessed on a first television network and accessed on a first web site exclusive of a second web site;
   generate a second audience size for the media accessed by the first devices of the first media platform at a second level of aggregation, the second level of aggregation corresponding to the media accessed on the first television network and accessed on the first web site and the second web site;

comparator circuitry to compare the first audience size to the second audience size;

adjustor circuitry to reduce the first audience size based on the second audience size in response to the first audience size being greater than the second audience size; and audience determination circuitry to determine a total audience size for the media accessed by devices of the first media platform based on the first audience size and the second audience size.

2. The apparatus of claim 1, wherein at least one of the first level of aggregation or the second level of aggregation corresponds to the media accessed on the first television network and a second television network and accessed on the first website exclusive of the second web site.

3. The apparatus of claim 1, wherein at least one of the first level of aggregation or the second level of aggregation corresponds to the media accessed on the first television network and a second television network and accessed on the first website and the second website.

4. The apparatus of claim 1, wherein the metrics generator circuitry is to generate the first audience size as a summation of first audience members that accessed the media via the first devices of the first media platform and second audience members that accessed the media via second devices of a second media platform, the metrics generator circuitry to generate the second audience size as a summation of third audience members that accessed the media via the first devices of the first media platform and fourth audience members that accessed the media via the second devices of the second media platform.

5. The apparatus of claim 1, wherein the first media platform is at least one of a television platform, a desktop platform, or a mobile platform.

6. The apparatus of claim 1, wherein the adjustor circuitry is to increase the first audience size based on the second audience size in response to the first audience size being less than the second audience size.

7. A method to determine a total audience size, the method comprising:

generating, by executing an instruction with processor circuitry, a first audience size for media accessed by first devices of a first media platform at a first level of aggregation, the first level of aggregation corresponding to the media accessed on a first television network and accessed on a first website exclusive of a second website;

generating, by executing an instruction with the processor circuitry, a second audience size for the media accessed by the first devices of the first media platform at a second level of aggregation, the second level of aggregation corresponding to the media accessed on the first television network and accessed on the first website and the second web site;

comparing, by executing an instruction with the processor circuitry, the first audience size to the second audience size;

reducing, by executing an instruction with the processor circuitry, the first audience size based on the second audience size in response to the first audience size being greater than the second audience size; and determining, by executing an instruction with the processor circuitry, a total audience size for the media accessed by devices of the first media platform based on the first audience size and the second audience size.

8. The method of claim 7, wherein at least one of the first level of aggregation or the second level of aggregation corresponds to the media accessed on the first television network and a second television network and accessed on the first website exclusive of the second web site.

9. The method of claim 7, wherein at least one of the first level of aggregation or the second level of aggregation corresponds to the media accessed on the first television network and a second television network and accessed on the first website and the second website.

10. The method of claim 7, wherein the first audience size is a summation of first audience members that accessed the media via the first devices of the first media platform and second audience members that accessed the media via second devices of a second media platform, and wherein the second audience size is a summation of third audience members that accessed the media via the first devices of the first media platform and fourth audience members that accessed the media via the second devices of the second media platform.

11. The method of claim 7, wherein the first media platform is at least one of a television platform, a desktop platform, or a mobile platform.

12. The method of claim 7, further including increasing the first audience size based on the second audience size in response to the first audience size being less than the second audience size.

13. At least one non-transitory computer readable storage medium comprising instruction that, when executed, cause processor circuitry to at least:

generate a first audience size for media accessed by first devices of a first media platform at a first level of aggregation, the first level of aggregation corresponding to the media accessed on a first television network and accessed on a first website exclusive of a second website;

generate a second audience size for the media accessed by the first devices of the first media platform at a second level of aggregation, the second level of aggregation corresponding to the media accessed on the first television network and accessed on the first website and the second website;

compare the first audience size to the second audience size;

reduce the first audience size based on the second audience size in response to the first audience size being greater than the second audience size; and determine a total audience size for the media accessed by devices of the first media platform based on the first audience size and the second audience size.

14. The at least one non-transitory computer readable storage medium of claim 13, wherein at least one of the first level of aggregation or the second level of aggregation corresponds to the media accessed on the first television network and a second television network and accessed on the first website exclusive of the second website.

15. The at least one non-transitory computer readable storage medium of claim 13, wherein at least one of the first level of aggregation or the second level of aggregation corresponds to the media accessed on the first television network and a second television network and accessed on the first website and the second website.

16. The at least one non-transitory computer readable storage medium of claim 13, wherein the first audience size is a summation of first audience members that accessed the media via the first devices of the first media platform and second audience members that accessed the media via second devices of a second media platform, and wherein the second audience size is a summation of third audience members that accessed the media via the first devices of the first media platform and fourth audience members that accessed the media via the second devices of the second media platform.

17. The at least one non-transitory computer readable storage medium of claim 13, wherein the first media platform is at least one of a television platform, a desktop platform, or a mobile platform.

18. The at least one non-transitory computer readable storage medium of claim 13, wherein the instructions, when executed, cause the processor circuitry to increase the first audience size based on the second audience size in response to the first audience size being less than the second audience size.

19. An apparatus comprising:
at least one memory;
instructions; and
processor circuitry to execute the instructions to:
  generate a first audience size for media accessed by first devices of a first media platform at a first level of aggregation, the first level of aggregation corresponding to the media accessed on a first television network and accessed on a first web site exclusive of a second web site;
  generate a second audience size for the media accessed by the first devices of the first media platform at a second level of aggregation, the second level of aggregation corresponding to the media accessed on the first television network and accessed on the first web site and the second web site;
  compare the first audience size to the second audience size;
  reduce the first audience size based on the second audience size in response to the first audience size being greater than the second audience size; and
  determine a total audience size for the media accessed by devices of the first media platform based on the first audience size and the second audience size.

20. The apparatus of claim 19, wherein at least one of the first level of aggregation or the second level of aggregation corresponds to the media accessed on the first television network and a second television network and accessed on the first website exclusive of the second website.

21. The apparatus of claim 19, wherein at least one of the first level of aggregation or the second level of aggregation corresponds to the media accessed on the first television network and a second television network and accessed on the first website and the second website.

22. The apparatus of claim 19, wherein the first audience size is a summation of first audience members that accessed the media via the first devices of the first media platform and second audience members that accessed the media via second devices of a second media platform, and wherein the second audience size is a summation of third audience members that accessed the media via the first devices of the first media platform and fourth audience members that accessed the media via the second devices of the second media platform.

23. The apparatus of claim 19, wherein the first media platform is at least one of a television platform, a desktop platform, or a mobile platform.

24. The apparatus of claim 19, wherein the processor circuitry is to execute the instructions to increase the first audience size based on the second audience size in response to the first audience size being less than the second audience size.

* * * * *